United States Patent
Nakata et al.

(10) Patent No.: US 7,036,134 B2
(45) Date of Patent: Apr. 25, 2006

(54) OPTICAL HEAD AND METHOD OF MANUFACTURING THE SAME

(75) Inventors: Hideki Nakata, Soraku-gun (JP); Hironori Tomita, Ikoma (JP); Hideki Aikoh, Higashiosaka (JP); Kenichi Miyamori, Toyonaka (JP); Takuya Wada, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/965,115

(22) Filed: Oct. 14, 2004

(65) Prior Publication Data

US 2005/0047319 A1 Mar. 3, 2005

Related U.S. Application Data

(63) Continuation of application No. 09/506,347, filed on Feb. 17, 2000, now abandoned.

(30) Foreign Application Priority Data

Feb. 24, 1999 (JP) .................................. 11-045749
Sep. 8, 1999 (JP) .................................. 11-254378

(51) Int. Cl.
*G11B 7/00* (2006.01)
(52) U.S. Cl. .............. 720/689; 369/112.01; 369/112.29
(58) Field of Classification Search .................... None
See application file for complete search history.

(56) References Cited

U.S. PATENT DOCUMENTS

| | | | |
|---|---|---|---|
| 4,185,913 A | 1/1980 | Ammann et al. | |
| 4,596,444 A | 6/1986 | Ushida | |
| 4,614,431 A * | 9/1986 | Komeyama | 356/401 |
| 4,734,899 A | 3/1988 | Van Sluys | |
| 4,745,589 A | 5/1988 | Nomura | |
| 4,959,820 A | 9/1990 | Horimai et al. | |
| 4,991,161 A | 2/1991 | Ikegame et al. | |
| 5,005,162 A | 4/1991 | Mitsumori et al. | |
| 5,091,793 A | 2/1992 | Goto et al. | |
| 5,218,587 A | 6/1993 | Nomiyama et al. | |
| 5,237,557 A | 8/1993 | Kasahara et al. | |
| 5,541,908 A | 7/1996 | Hsu et al. | |
| 5,581,524 A | 12/1996 | Fujino | |
| 5,608,696 A | 3/1997 | Makigaki | |
| 5,615,053 A | 3/1997 | Toyama et al. | |
| 5,708,633 A | 1/1998 | Hollen et al. | |

(Continued)

FOREIGN PATENT DOCUMENTS

EP 0 252 562 1/1998

(Continued)

*Primary Examiner*—Thang V. Tran
*Assistant Examiner*—Tawfik Goma
(74) *Attorney, Agent, or Firm*—Hamre, Schumann, Mueller & Larson, P.C.

(57) ABSTRACT

A reflecting mirror and an optical bench are placed on an external jig provided with a mirror holding portion for maintaining the reflecting mirror, and then the reflecting mirror and the optical bench are bonded and fixed, thus obtaining an optical head. An adhesion reference plane for the reflecting mirror is no longer required in the optical bench, thus reducing the size and cost of the optical bench. The mounting precision is high and stable. Further, the reflecting mirror is bonded and fixed at the vicinities of the approximate centers of its two opposed side faces and therefore the variation in orientation of the reflecting mirror due to expansion or contraction of an adhesive is lessened, thus achieving a highly-reliable optical head excellent in environmental stability characteristics.

4 Claims, 26 Drawing Sheets

U.S. PATENT DOCUMENTS

| | | |
|---|---|---|
| 5,787,067 A | 7/1998 | Song |
| 5,894,370 A * | 4/1999 | Okuda et al. ............... 359/822 |
| 5,920,532 A | 7/1999 | Yagi et al. |
| 5,946,146 A | 8/1999 | Haruguchi et al. |
| 5,982,564 A | 11/1999 | Nagai |
| 5,986,983 A | 11/1999 | Simpson et al. |
| 6,002,661 A * | 12/1999 | Abe et al. ............... 369/112.01 |
| 6,016,293 A | 1/2000 | Lee et al. |
| 6,044,048 A | 3/2000 | Oinoue et al. |
| 6,246,644 B1 | 6/2001 | Seo |
| 6,310,852 B1 | 10/2001 | Tomita et al. |
| 6,445,671 B1 * | 9/2002 | Takeda et al. ............... 369/121 |
| 2004/0090881 A1 | 5/2004 | Nakata et al. |

FOREIGN PATENT DOCUMENTS

| | | |
|---|---|---|
| JP | 60-16321 | 2/1985 |
| JP | 60-20024 | 2/1985 |
| JP | 62-150728 | 9/1987 |
| JP | 63-50920 | 3/1988 |
| JP | 64-15317 | 1/1989 |
| JP | 1-97413 | 6/1989 |
| JP | 1-173434 | 7/1989 |
| JP | 1-277330 | 7/1989 |
| JP | 1-224720 | 9/1989 |
| JP | 3-147536 | 6/1991 |
| JP | 3-207027 | 9/1991 |
| JP | 4-349221 | 12/1992 |
| JP | 5-135404 | 6/1993 |
| JP | 5-314535 | 11/1993 |
| JP | 6-20285 | 1/1994 |
| JP | 7-6533 | 1/1995 |
| JP | 7-201064 | 8/1995 |
| JP | 7-240035 | 9/1995 |
| JP | 8-36771 | 2/1996 |
| JP | 9-35322 | 2/1997 |
| JP | 9-231592 | 9/1997 |
| JP | 10-320802 | 12/1998 |

* cited by examiner (A)

OPTICAL HEAD AND METHOD OF MANUFACTURING THE SAME

This application is a division of application Ser. No. 09/506,347, filed Feb. 17, 2000 now abandoned, which application is incorporated herein by reference.

FIELD OF THE INVENTION

The present invention relates to an optical head used in a disk recording/reproducing apparatus that optically records or reproduces information by projecting a light spot on a disk information recording medium and to a method of manufacturing the same.

BACKGROUND OF THE INVENTION

Recently, disk recording/reproducing apparatuses have been used for many applications, such as for DVDs, MDs, CDs, CD-ROMs, or the like, which have been diversified year after year. In addition, they have been increasingly improved in density, performance, quality, and added value and have been reduced in size. Particularly, in disk recording/reproducing apparatuses using recordable magneto-optical media, the demand for those used for data and music recording tends to increase considerably, and further reduction in size and thickness and further improvement in performance and recording density have been asked for.

Conventionally, many techniques relating to optical heads for magneto-optical disks have been reported.

As an example of a conventional disk recording/reproducing apparatus, an optical head for a magneto-optical disk is described with reference to drawings as follows.

FIG. 23 is an exploded perspective view showing a schematic configuration of a conventional optical head, and FIG. 24 is an enlarged sectional view showing a method of fixing a reflecting mirror in the optical head shown in FIG. 23. FIG. 25A is an optical-path diagram showing optical paths in the optical head shown in FIG. 23, and FIG. 25B is a plan view showing light receiving areas and light spots on a light receiving plane of a multisplit photodetector. FIG. 26 is a signal circuit diagram showing a method of processing signals obtained by the multisplit photodetector in the optical head shown in FIG. 23.

In FIGS. 23 to 26, numeral 101 indicates a semiconductor laser, numeral 102 a collimator lens, numeral 103 a diffraction grating, numeral 104 a composite device including a beam splitter 104a, a polarization separation element 104b, and a return mirror 104c, numeral 105 an objective lens, numeral 106 an information recording medium (a magneto-optical disk) having a magneto-optical effect, numeral 107 receiving optics for monitoring, numeral 108 a convex lens, numeral 109 a concave cylindrical lens, numeral 110 a holding member, numeral 111 a multisplit photodetector, numerals 112 and 113 focal points of light spots, numeral 114 a main beam (P-polarized light) formed on the multisplit photodetector 111, numeral 115 a main beam (S-polarized light) formed on the multisplit photodetector 111, numeral 116 a main beam (P+S-polarized light) formed on the multisplit photodetector 111, numeral 117 light spots formed of preceding beams out of sub-beams, and numeral 118 light spots formed of subsequent beams out of the sub-beams. Numeral 119 denotes a four-split light receiving area, numeral 120 a preceding-beam receiving area, numeral 121 a subsequent-beam receiving area, numerals 122a and 122b are light receiving areas for an information signal, numeral 123 subtractors, numeral 124 adders. Numeral 125 represents an optical bench, numeral 126 a reflecting mirror, numeral 127 adhesion reference planes of the optical bench 125, numeral 128 an adhesion reference plane of the reflecting mirror 126, numeral 129 positioning walls for positioning the reflecting mirror 126, which are formed in the optical bench 125, numeral 130 adhesive storages, numeral 131 a UV adhesive, and numeral 132 an objective lens actuator.

The conventional optical head with the above-mentioned configuration is described as follows.

The reflecting mirror 126 is fixed to the optical bench 125 as follows. As shown in FIGS. 23 and 24, the positioning walls 129 for positioning the reflecting mirror 126 are formed in the optical bench 125. The reflecting mirror 126 is mounted along the positioning walls 129. After that, as shown in FIG. 24, by applying a preload 151 in a direction parallel to a reflecting plane of the reflecting mirror 126 and a preload 152 in a direction perpendicular to the reflecting plane of the mirror 126, one side face (a lower end face) of the reflecting mirror 126 and a positioning wall 129 of the optical bench 125, and the adhesion reference plane (the plane opposite to the reflecting plane) 128 of the reflecting mirror 126 and the adhesion reference planes 127 of the optical bench 125 are brought into contact, respectively. Thus, the reflecting mirror 126 is positioned with high precision. In this state, the UV adhesive 131 is applied to the adhesive storages 130 and ultraviolet rays are irradiated thereonto, thus bonding and fixing the reflecting mirror 126 to the optical bench 125 through the UV adhesive 131 with high precision.

Next, the following description is directed to the operation of an optical head in a completed state, into which various components have been incorporated.

A beam emitted from the semiconductor laser 101 is converted to parallel light by the collimator lens 102 and separated into a plurality of different parallel beams of light by the diffraction grating 103. The plurality of different parallel beams of light pass through the beam splitter 104a in the composite device 104 and then form a light spot of a main beam with a diameter of about 1 micron and respective light spots of the preceding beams and the subsequent beams as the sub-beams in a so-called "three beams method" on the information recording medium 106 by the objective lens 105 incorporated into the objective lens actuator 132. The respective light spots of the preceding beams and the subsequent beams are formed in front of and behind the light spot of the main beam at certain intervals on the same track as that on which the light spot of the main beam is formed. A parallel beam of light reflected by the beam splitter 104a in the composite device 104 enters the receiving optics 107 for monitoring to control a driving current for the semiconductor laser 101.

Reflected light from the information recording medium 106 travels along the reverse path to be reflected and separated by the beam splitter 104a in the composite device 104, which is then incident on the polarization separation element 104b. The semiconductor laser 101 is mounted so that the polarization direction of a beam emitted therefrom is parallel to the surface of the paper showing FIG. 25A. Incident light on the polarization separation element 104b is separated into three beams of light, i.e. two beams of light whose polarized components are orthogonal to each other and one beam of light having two polarized components orthogonal to each other, by the polarization separation element 104b. These three beams of light are then reflected by the reflecting mirror 104c.

Reflected light that has passed through the composite element 104 enters the convex lens 108 with an approximate cylindrical shape to become convergent light and then enters the concave cylindrical lens 109 with an approximate cylindrical shape. In this case, the concave cylindrical lens 109 is provided so as to have a lens effect in the direction that forms an angle of about 45 degrees with respect to an image on a recording track of the information recording medium 106 oriented in the direction of W1 in the present example.

Light that has passed through the concave cylindrical lens 109 generates astigmatism that serves as a means for detecting a focus error signal. When passing through a plane having no lens effect in the concave cylindrical lens 109, the light travels in the optical path indicated with an unbroken line to be converged at the focal point 112. When passing through a plane having a lens effect, the light travels in the optical path indicated with a broken line to be converged at the focal point 113.

The concave cylindrical lens 109 is rotated to be adjusted so that the direction W2 (not shown in the figures) having a lens effect in the concave cylindrical lens 109 forms an angle of about 45 degrees with respect to the holding member 110. In addition, the convex lens 108 and the concave cylindrical lens 109 are fixed by the holding member 110 at a predetermined interval in an optical axis direction.

The multisplit photodetector 111 is mounted so that its light receiving plane is positioned approximately midway between the focal point 112 and the focal point 113. The sums of the electric signals generated in respective diagonal areas in the four-split light receiving area 119 at the center are calculated and one sum is subtracted from the other sum. Thus, a focus error signal is detected by a so-called "astigmatism method". The difference between the light spots 117 formed of preceding beams and the light spots 118 formed of subsequent beams is calculated, thus detecting a tracking error detection signal by a so-called "three beams method". By calculating the difference between the main beam 114 composed of P-polarized light and the main beam 115 composed of S-polarized light, an information signal of the information recording medium can be detected by a differential detection method. Furthermore, by calculating the sum of them, a prepit signal can be detected.

However, in the above-mentioned conventional configuration, the positioning walls 129 are provided for bonding and fixing the reflecting mirror 126 to the optical bench 125 with high position precision. Therefore, the overall height of the optical bench 125 increases. As a result, the overall height of the optical head increases.

Individual optical benches 125 may be different and therefore the variance in angle of the adhesion reference planes 127 with respect to the reference plane of the optical bench 125 occurs. Consequently, an axis of light entering the objective lens 105 varies considerably, resulting in unstable performance of the optical head.

On the other hand, when it is sought to process or form the adhesion reference planes 127 with high precision with respect to the reference plane of the optical bench 125 in order to reduce the variance in angle of the optical axis of the optical head, the cost for processing or forming the optical bench 125 increases.

The UV adhesive 131 may expand or contract depending on the variation in thermal environment in some cases. In the conventional configuration, the UV adhesive 131 fills the adhesive storages 130 and adheres to a part of the back face of the reflecting mirror 126. Therefore, the expansion or contraction of the UV adhesive 131 changes the mounting angle of the reflecting mirror 126 slightly. As a result, the optical axis of the optical head varies and therefore the performance of the optical head is deteriorated, which also has been a problem.

Since a working accuracy is required in the step of bonding and fixing the reflecting mirror 126 to the optical bench 125 with the UV adhesive 131, too much time and cost are required and thus mass-productivity is decreased, which has been a problem.

SUMMARY OF THE INVENTION

In view of the aforementioned conventional problems, the present invention aims to provide a thin optical head with high precision, a low price, high reliability, and high productivity by omitting the adhesion reference planes 127 and the positioning walls 129 of the optical bench 125 for positioning the reflecting mirror 126.

In order to attain the aforementioned object, the present invention employs the following configuration.

A method of manufacturing an optical head according to a first configuration of the present invention is directed to a method of manufacturing an optical head having a light source, an objective lens, a reflecting mirror that reflects beams of light from the light source to allow them to enter the objective lens, and an optical bench for maintaining the light source and the reflecting mirror. The method is characterized in that the reflecting mirror and the optical bench are bonded and fixed while being placed on an external jig provided with a mirror holding portion for maintaining the reflecting mirror.

According to the above-mentioned first manufacturing method, the reflecting mirror is bonded and fixed to the optical bench at a predetermined position while being maintained by the mirror holding portion of the external jig. Therefore, the positioning walls and the adhesion reference planes are not necessary, which have been provided in the conventional optical bench. Thus, the size and thickness of the optical head can be reduced. In addition, when the mirror holding portion of the external jig to be used repeatedly is pre-processed with high precision, a high forming precision or a high processing precision is not required for the reflecting-mirror mounting portion in the optical bench. Therefore, the dimensional precision of the optical bench can be relaxed considerably, and thus the price of the optical head can be lowered. Furthermore, the problem of the instability in quality of the optical head due to the variance in processing precision of the mirror mounting portion in the optical bench also can be solved.

In the above-mentioned first manufacturing method, it is preferable that the reflecting mirror is placed on the mirror holding portion at a predetermined angle. According to such a preferable configuration, the mounting angle at which the reflecting mirror is mounted to the optical bench is stabilized, thus suppressing the variation of the optical axis.

In the above-mentioned preferable manufacturing method, it is preferable that the reflecting mirror is placed so that a reflecting plane of the reflecting mirror contacts with an angle reference plane of the mirror holding portion. Since the reflecting plane of the reflecting mirror is brought into contact with the angle reference plane, the reflecting mirror can be mounted with high precision in the mounting angle by a simple method. Thus, desired reflection characteristics can be obtained stably with high precision.

In the above-mentioned first manufacturing method, it is preferred to specify the position of the reflecting mirror in a direction parallel to the reflecting plane by bringing the reflecting mirror into contact with the mirror holding portion. According to such a preferable configuration, the reflecting-mirror mounting position can be maintained with high precision by a simple method. Further, since the optical bench is not required to have a mechanism for positioning the reflecting mirror in the above-mentioned direction, the processing precision of the mirror mounting portion in the optical bench is relaxed, thus lowering the cost of an optical head.

In addition, in the above-mentioned first manufacturing method, it is preferred not to allow the reflecting mirror to contact directly with the optical bench. According to such a configuration, the reflecting mirror is maintained in the optical bench through an adhesive. Therefore, the processing precision of the mirror mounting portion in the optical bench can be relaxed.

In the above-mentioned first manufacturing method, it is preferable that the reflecting mirror is bonded and fixed at the vicinities of the approximate centers of its two opposed side faces approximately orthogonal to the reflecting plane of the reflecting mirror. According to such a preferable configuration, since the variations in angle and position of the reflecting mirror, which are caused by expansion and contraction of the adhesive when the optical head is left in an environment, are lessened, the variation of the optical axis is lessened, thus achieving a highly-reliable optical head excellent in environmental stability characteristics.

In the above-mentioned first manufacturing method, it is preferable that the reflecting mirror has a flat-plate shape.

Further, in the above-mentioned first manufacturing method, it is preferred to bond and fix the reflecting mirror using a UV adhesive, since an excellent bonding and fixing work efficiency can be obtained.

An optical head according to a first configuration of the present invention includes: a light source; an objective lens; a reflecting mirror that reflects beams of light from the light source to allow them to enter the objective lens; and an optical bench for maintaining the light source and the reflecting mirror. The optical head is characterized in that the reflecting mirror is bonded and fixed to the optical bench, and in a reflecting-mirror mounting portion in the optical bench, no reference plane for specifying the mounting angle of the reflecting mirror through the contact therewith is present.

According to the above-mentioned first optical head, since the optical bench has no reference plane for mounting the reflecting mirror, the size and thickness of the optical head can be reduced. A high forming or processing precision is no longer required in the reflecting-mirror mounting portion in the optical bench, and therefore the dimensional precision of the optical bench can be relaxed considerably, thus lowering the cost of the optical head. In addition, the problem of instability in quality of the optical head due to the variance in processing precision of the mirror mounting portion in the optical bench also is solved.

In the above-mentioned first optical head, it is preferable that the reflecting mirror is not in direct contact with the optical bench. According to such a configuration, the reflecting mirror is maintained in the optical bench through the adhesive. Therefore, the processing precision of the mirror mounting portion in the optical bench can be relaxed.

In the above-mentioned first optical head, it is preferable that the reflecting mirror is bonded and fixed at the vicinities of the approximate centers of its two opposed side faces approximately orthogonal to a reflecting plane of the reflecting mirror. According to such a preferable configuration, since the variations in angle and position of the reflecting mirror, which are caused by expansion and contraction of the adhesive when the optical head is left in an environment, are lessened, the variation of the optical axis is lessened, thus achieving a highly-reliable optical head excellent in environmental stability characteristics.

In the above-mentioned first optical head, it is preferable that the reflecting mirror has a flat-plate shape.

Further, in the above-mentioned first optical head, it is preferred to bond and fix the reflecting mirror using a UV adhesive, since an excellent bonding and fixing work efficiency can be obtained.

An optical head according to a second configuration of the present invention includes: a light source; an objective lens for forming a light spot on an information recording medium; a member for reflecting beams of light that reflects beams of light from the light source to allow them to enter the objective lens and that is positioned between the objective lens and the light source; and a resin optical bench for maintaining the light source. The optical head is characterized in that the member for reflecting beams of light is a reflecting mirror obtained by forming a reflection film on a resin or glass base, and the member for reflecting beams of light and the resin optical bench are integrally molded.

According to the above-mentioned second optical head, the optical bench is formed by resin molding and a resin or glass reflecting mirror is placed on a mold used for molding. In this case, the position and angle of the reflecting mirror to be placed are controlled strictly with respect to the mold and then the resin molding is carried out, thus integrally molding the optical bench and the reflecting mirror. Therefore, the positioning walls and the adhesion reference planes for the reflecting mirror, which have been included in the conventional optical bench, can be omitted, thus reducing the size and thickness of the optical head. Furthermore, it is no longer required to control the forming or processing precision of the positioning walls and the adhesion reference planes for the reflecting mirror, which have been included in the conventional optical bench. Therefore, the dimensional precision of the optical bench can be relaxed considerably. At the same time, an optical head stable in quality with high precision can be obtained. In addition, since the work for bonding and fixing the reflecting mirror is no longer required, the mass-productivity of the optical head is improved and thus its cost can be reduced.

The reflecting mirror is not fixed to the optical bench with an adhesive but is integrally molded, thus eliminating the influence of the expansion or contraction of the adhesive due to the variation in thermal environment. As a result, the variations in angle and position of the reflecting mirror can be lessened considerably and therefore the variation of the optical axis of the optical head is lessened, thus achieving a highly-reliable optical head excellent in environmental stability characteristics.

An optical head according to a third configuration of the present invention includes: a light source; an objective lens for forming a light spot on an information recording medium; a member for reflecting beams of light that reflects beams of light from the light source to allow them to enter the objective lens and that is positioned between the objective lens and the light source; and a resin optical bench for maintaining the light source. The optical head is characterized in that the member for reflecting beams of light is obtained by forming a reflection film on a surface of the resin optical bench.

According to the above-mentioned third optical head, the optical bench is formed by resin molding and at the time of the resin molding, a base of the member for reflecting beams of light is molded simultaneously. After the molding, a reflection film is formed by metal evaporation or the like, thus completing the member for reflecting beams of light. In other words, since no reflecting mirror is used, no breakage or cracking of the reflecting mirror occurs and it is no longer necessary to consider a dimensional margin for an error in positioning of the reflecting mirror or the like preliminarily. Further, the positioning walls and the adhesion reference planes for the reflecting mirror, which have been included in the conventional optical bench, can be omitted, thus reducing the size and thickness of the optical head. The works for positioning, and bonding and fixing the reflecting mirror are no longer required, thus improving the mass-productivity of the optical head and lowering its cost.

The base of the member for reflecting beams of light and the optical bench are resin-molded as a one-piece component at a time, thus eliminating the influence of expansion or contraction of the adhesive due to the variation in thermal environment. As a result, the variations in angle and position of the member for reflecting beams of light can be lessened considerably. Consequently, the variation of the optical axis of the optical head can be lessened, thus achieving a highly-reliable optical head excellent in environmental stability characteristics.

BRIEF DESCRIPTION OF THE DRAWINGS

FIG. 1A is a plan view, FIG. 1B is a sectional view taken along line I—I and seen from the direction indicated by arrows shown in FIG. 1A, and FIG. 1C is a sectional view taken along line II—II and seen from the direction indicated by arrows shown in FIG. 1A.

FIG. 2A is a view seen from a direction perpendicular to a reflecting plane of the reflecting mirror and FIG. 2B is a sectional view taken along line III—III and seen from the direction indicated by arrows shown in FIG. 2A.

FIG. 3A is a view seen from an objective lens side and FIG. 3B is a sectional view taken along line IV—IV and seen from the direction indicated by arrows shown in FIG. 3A.

FIG. 5A is a front view and FIG. 5B is a side view.

FIG. 9A is a plan view, FIG. 9B is a sectional view taken along line V—V and seen from the direction indicated by arrows shown in FIG. 9A, and FIG. 9C is a sectional view taken along line VI—VI and seen from the direction indicated by arrows shown in FIG. 9A.

FIG. 14A is a front view and FIG. 14B is a side view.

FIG. 17A is a perspective view, FIG. 17B is a sectional view in a plane including an optical axis, and FIG. 17C is a partial enlarged sectional view of a portion A shown in FIG. 17B.

FIG. 18A is a perspective view and FIG. 18B is a partial enlarged sectional view of the member for reflecting beams of light, in a plane including an optical axis.

DETAILED DESCRIPTION OF THE INVENTION

Embodiments of the present invention are described with reference to the drawings as follows.

First Embodiment

Figure 1:
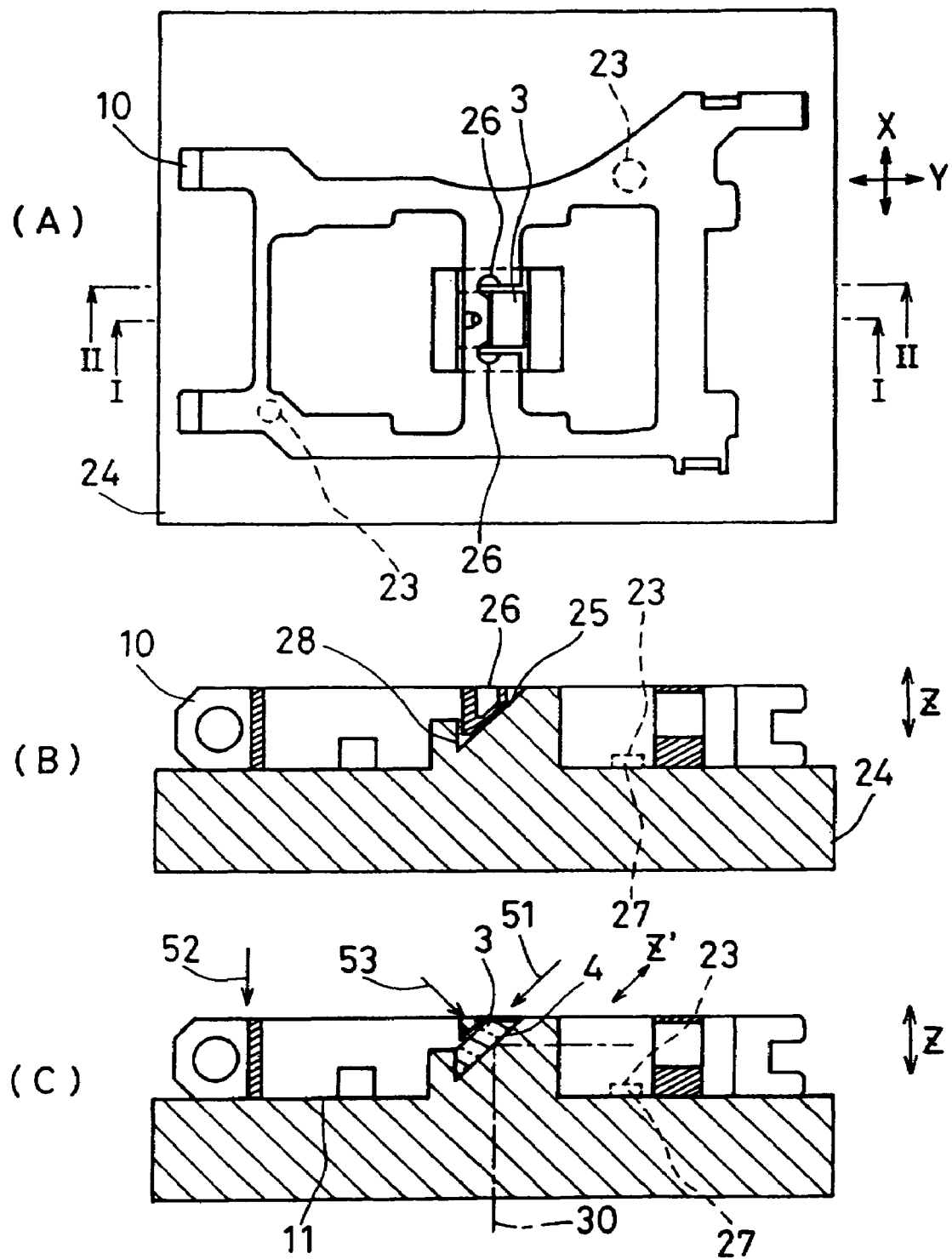
FIG. 1 shows schematic views illustrating a method of mounting a reflecting mirror to an optical bench according to a first embodiment of the present invention.
Figure 2:
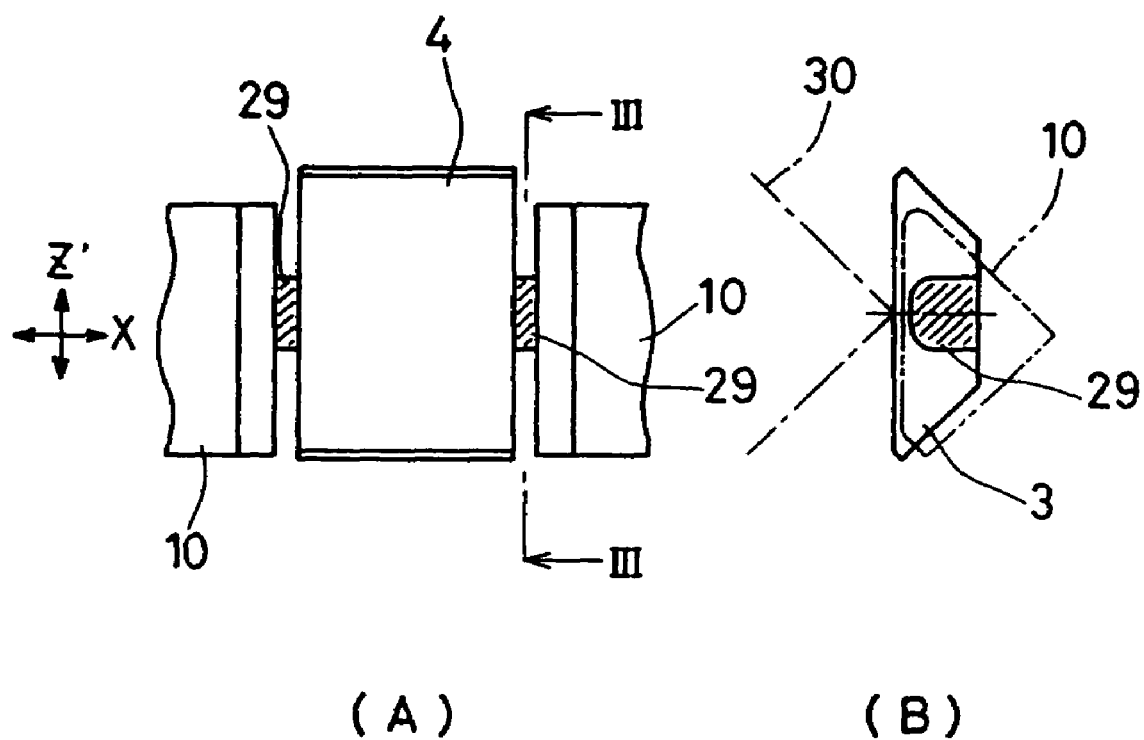
FIG. 2 shows partial enlarged views illustrating details of a reflecting-mirror mounting portion shown in FIG. 1.
Figure 3:
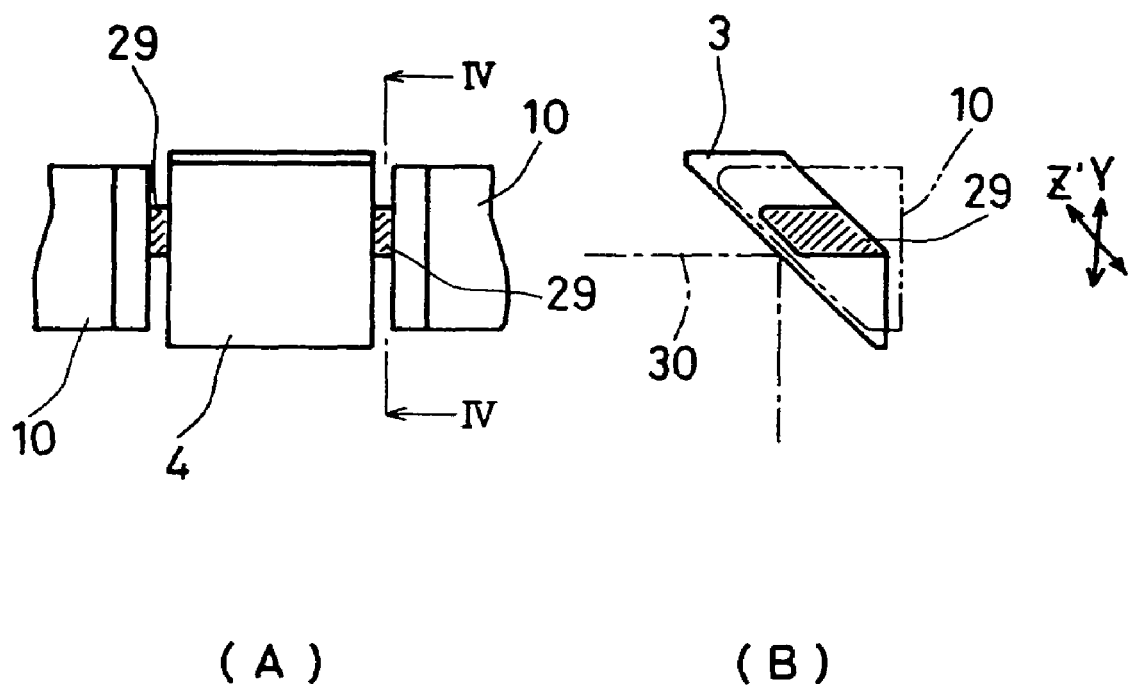
FIG. 3 shows partial enlarged views illustrating details of the reflecting-mirror mounting portion shown in FIG. 1.
Figure 4:
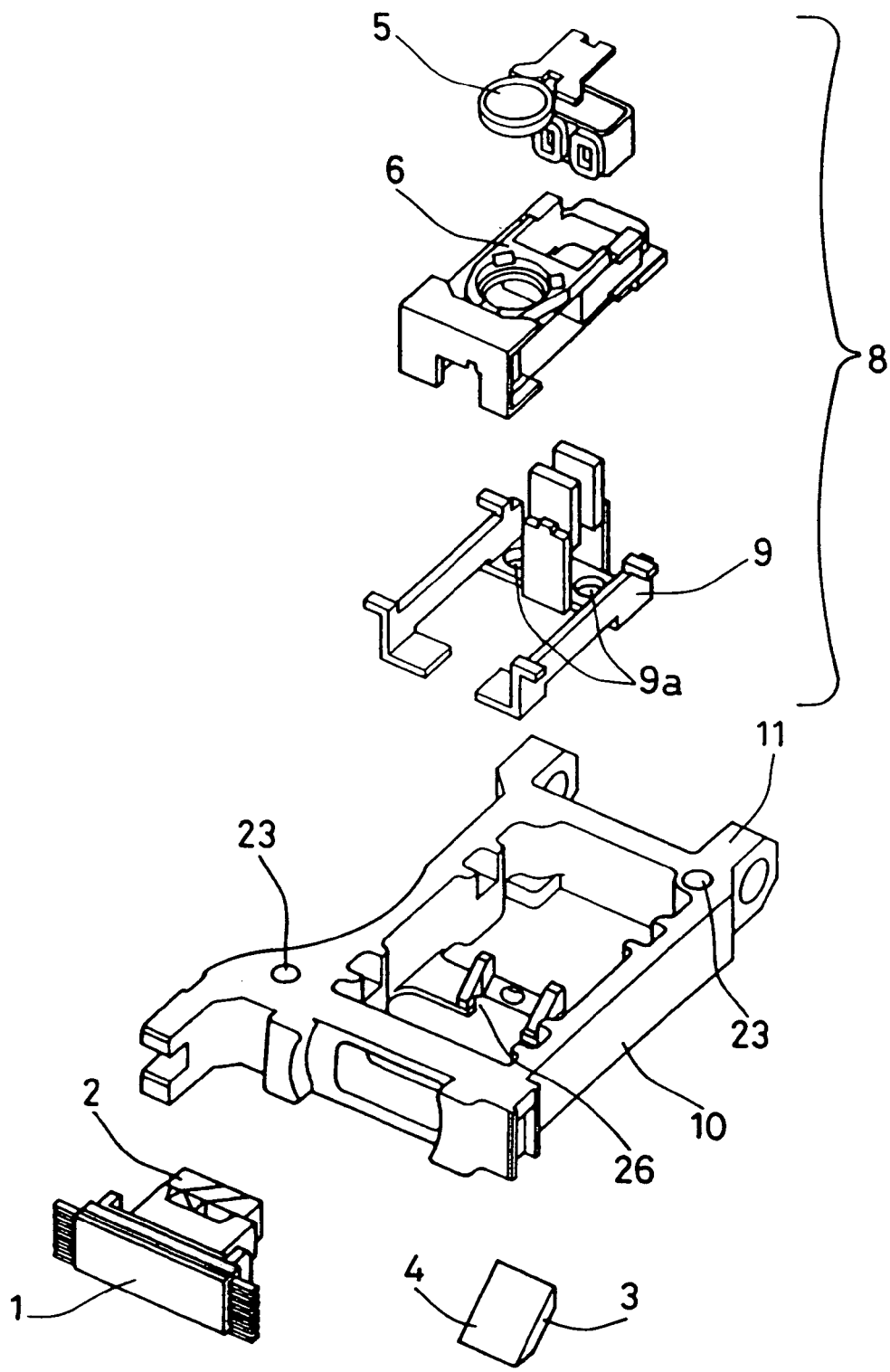
FIG. 4 is an exploded perspective view showing a schematic configuration of an optical head according to the first embodiment of the present invention.
Figure 5:
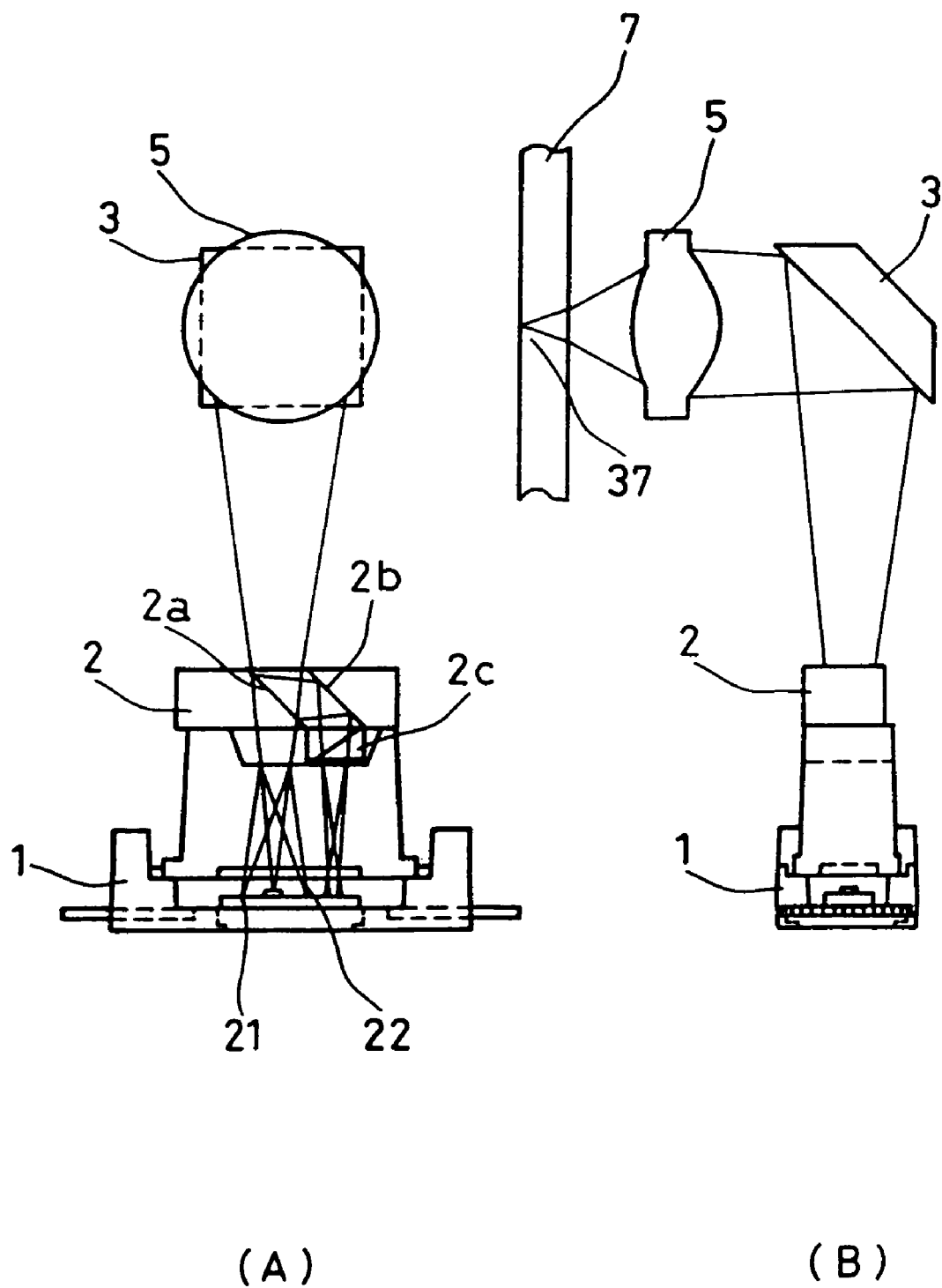
FIG. 5 shows optical-path diagrams illustrating optical paths in the optical head according to the first embodiment of the present invention.
Figure 6:
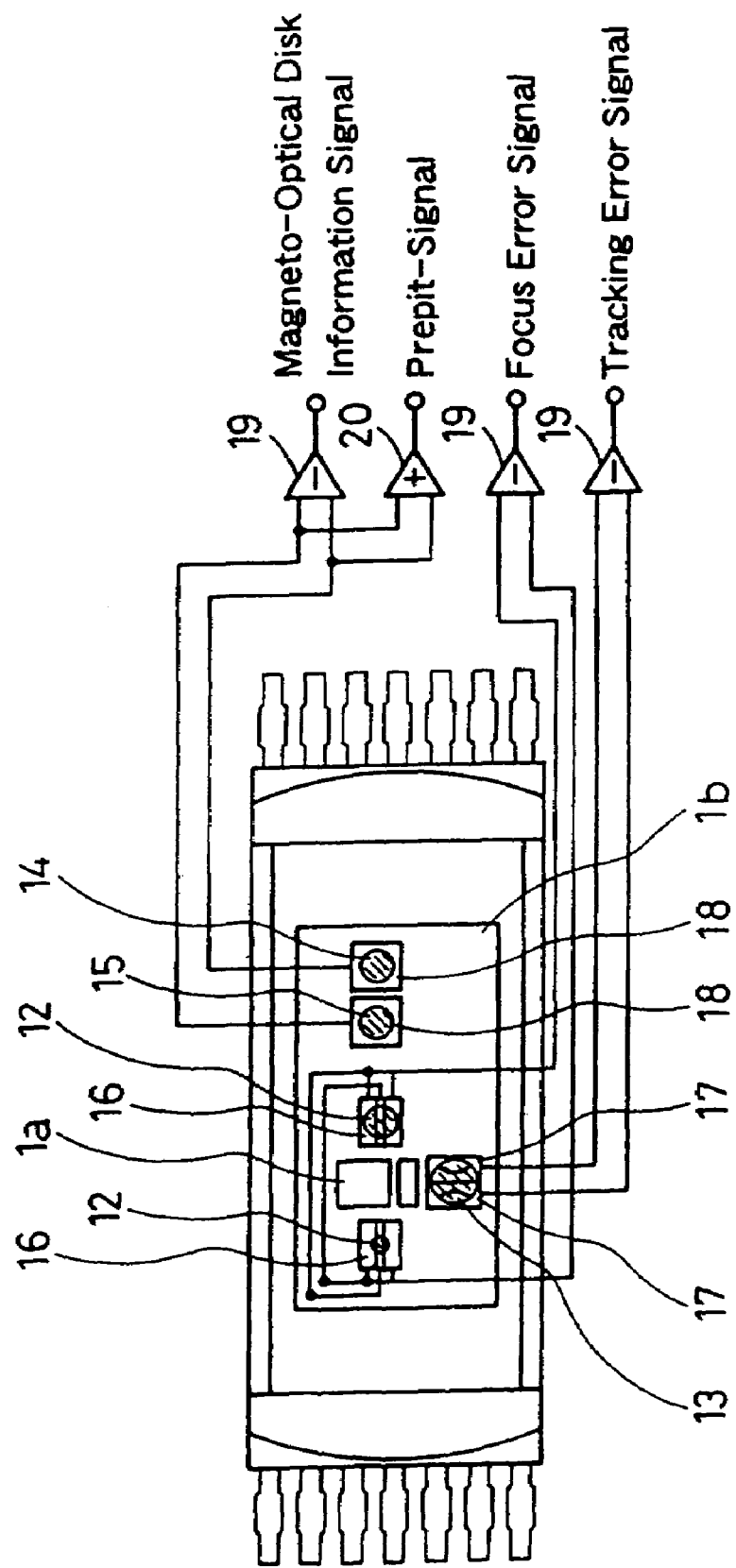
FIG. 6 is a signal circuit diagram showing a method of processing signals obtained by a multisplit photodetector in the optical head according to the first embodiment of the present invention.
Figure 7:
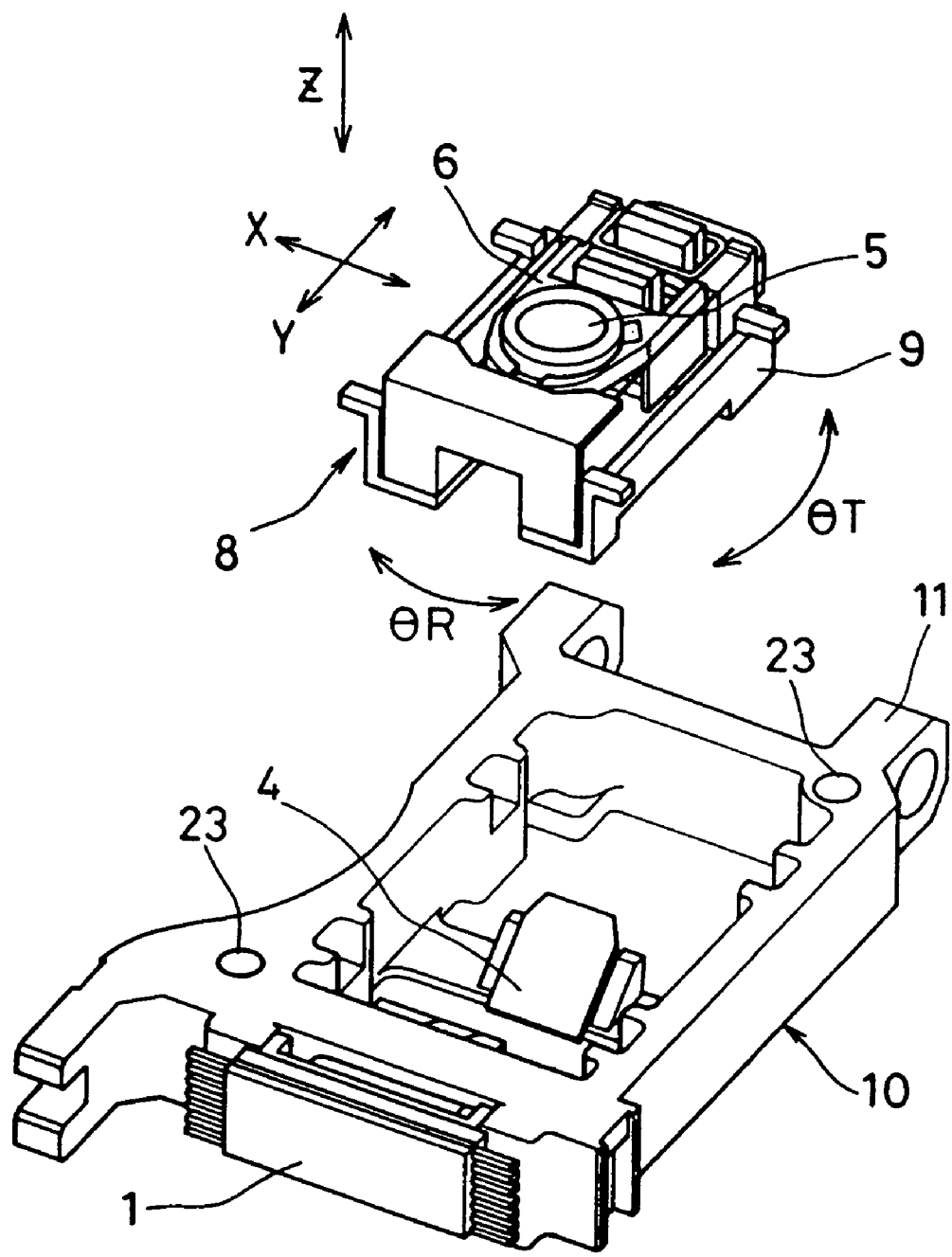
FIG. 7 is an exploded perspective view showing a method of adjusting an objective lens actuator and an optical bench in the optical head according to the first embodiment of the present invention.
Figure 8:
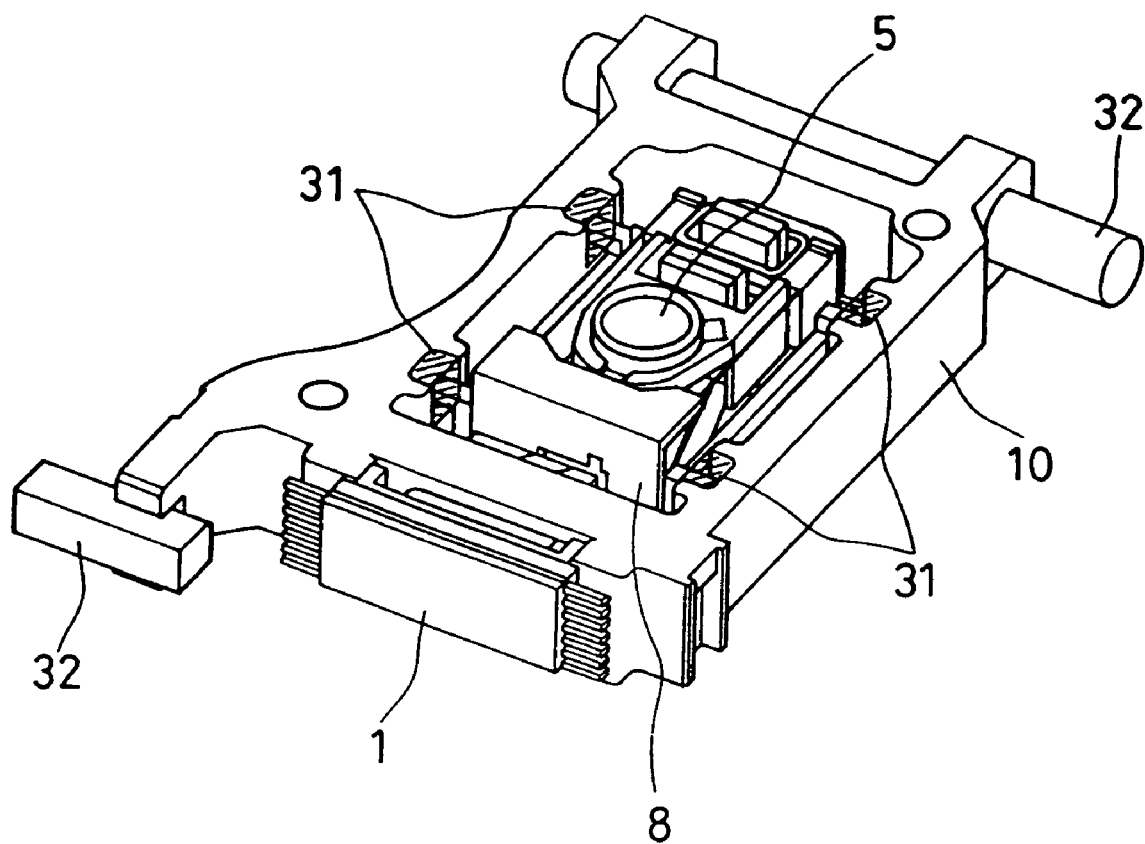
FIG. 8 is a perspective view of the whole optical head according to the first embodiment of the present invention.

FIG. 1 shows schematic views illustrating a method of mounting a reflecting mirror to an optical bench according to a first embodiment. FIG. 1A is a plan view, FIG. 1B is a sectional view taken along line I—I and seen from the direction indicated by arrows shown in FIG. 1A, and FIG. 1C is a sectional view taken along line II—II and seen from the direction indicated by arrows shown in FIG. 1A. FIG. 2 shows partial enlarged views illustrating details of a reflecting-mirror mounting portion shown in FIG. 1. FIG. 2A is a view seen from a direction perpendicular to a reflecting plane of the reflecting mirror, and FIG. 2B is a sectional view taken along line III—III and seen from the direction indicated by arrows shown in FIG. 2A. FIG. 3 shows partial enlarged views illustrating details of the reflecting-mirror mounting portion shown in FIG. 1. FIG. 3A is a view seen from an objective lens side and FIG. 3B is a sectional view taken along line IV—IV and seen from the direction indicated by arrows shown in FIG. 3A. FIG. 4 is an exploded perspective view showing a schematic configuration of an optical head according to the first embodiment. FIG. 5 shows optical-path diagrams illustrating optical paths in the optical head according to the first embodiment. FIG. 5A is a front view and FIG. 5B is a side view. FIG. 6 is a signal circuit diagram showing a method of processing signals obtained by a multisplit photodetector in the optical head according to the first embodiment. FIG. 7 is an exploded perspective view showing a method of adjusting an objective lens actuator and an optical bench in the optical head according to the first embodiment. FIG. 8 is a perspective view of the whole optical head according to the first embodiment.

In FIGS. 1 to 8, numeral 1 indicates a receiving/emitting optics including a semiconductor laser 1a, a multisplit photodetector 1b, a hologram element, and the like, numeral 2 a composite device including a beam splitter 2a, a return mirror 2b, and a polarization separation element 2c, numeral 3 a reflecting mirror, numeral 4 a reflecting plane (a reference plane) of the reflecting mirror 3, numeral 5 an objective lens, numeral 6 an objective lens holder for fixing and maintaining the objective lens 5, numeral 7 an information recording medium (a magneto-optical disk) having a magneto-optical effect, numeral 8 an objective lens actuator for actuating the objective lens 5 in a focus direction (a normal direction) and a radial direction of the information recording medium 7, numeral 9 a base for maintaining the objective lens actuator 8, numeral 9a positioning holes provided in the base 9, numeral 10 an optical bench, numeral 11 a reference plane of the optical bench 10, numeral 12 light spots for detecting a focus error signal, which are formed on the receiving/emitting optics 1, numeral 13 a light spot for detecting a tracking error signal, which is formed on the receiving/emitting optics 1, numeral 14 a main beam (P-polarized light) formed on the receiving/emitting optics 1, numeral 15 a main beam (S-polarized light) formed on the receiving/emitting optics 1, numeral 16 light receiving areas for a focus error signal, numeral 17 light receiving areas for a tracking error signal, numeral 18 light receiving areas for an information signal, numeral 19 subtractors, numeral 20 an adder, and numerals 21 and 22 focal points of the light spots for detecting a focus error signal. Further, numeral 23 denotes positioning holes formed in the optical bench 10, numeral 24 an external jig, numeral 25 an adhesion reference plane for the reflecting mirror 3, which is formed in the external jig 24, numeral 26 adhesive storages in the optical bench 10, numeral 27 positioning pins formed on the external jig 24, a numeral 28 a positioning wall formed in the external jig 24, numeral 29 a UV adhesive, numeral 30 an optical axis, numeral 31 an adhesive for fixing the base 9 to the optical bench 10, numeral 32 guide axes for moving the optical bench 10, and numeral 37 a light spot focused on the information recording medium 7.

The first embodiment of the present invention with the above-mentioned configuration is described as follows.

For convenience in the following description, as shown in FIG. 1A, an X axis (in a radial direction of the magneto-optical disk 7), a Y axis (in a tangential direction of the magneto-optical disk 7), and a Z axis (in a normal direction of the magneto-optical disk 7) are set as orthogonal coordinate axes. Further, as shown in FIG. 1C, the direction orthogonal to the X axis and parallel to the reflecting plane of the reflecting mirror 3 is set as a Z' axis.

The reflecting mirror 3 is fixed to the optical bench 10 as follows.

In the present embodiment, the external jig 24 is used for fixing the reflecting mirror 3. The external jig 24 has the positioning pins 27 and a mirror holding portion on its surface. The positioning pins 27 fit into the positioning holes 23 of the optical bench 10 to position the optical bench 10. The mirror holding portion is provided with the adhesion reference plane 25 and the positioning wall 28 for maintaining the reflecting mirror 3 at a predetermined position and a predetermined angle. The adhesion reference plane 25 specifies the mounting angle of the reflecting mirror 3 and the positioning wall 28 specifies the position of the reflecting mirror in the Z' axis direction (i.e. the position in the Z axis direction). The upper face of the external jig 24 is processed with high precision. Thus, the error in angle between the upper face and the adhesion reference plane 25, and the position in the Z axis direction of the intersection of the adhesion reference plane 25 and the positioning wall 28 are controlled with high precision.

As shown in FIG. 1, the reflecting mirror 3 is placed on the adhesion reference plane 25 of the external jig 24 with the reflecting plane 4 facing the adhesion reference plane 25. A preload 51 in the Z' axis direction is applied to press the reflecting mirror 3 onto the positioning wall 28, thus positioning the reflecting mirror 3 in the Z' axis direction. In this state, the optical bench 10 is placed on the external jig 24 with its reference plane 11 facing the external jig 24. In this stage, the positioning pins 27 of the external jig 24 are fitted into the positioning holes 23 of the optical bench 10, thus positioning the optical bench 10 in an X-Y plane. Then, the reference plane 11 serving as an angle reference of the optical bench 10 and the upper face of the external jig 24 are allowed to adhere by the application of a preload 52 in the direction perpendicular to the upper face of the external jig 24. It is not necessary to position the reflecting mirror 3 in the X axis direction precisely. However, if necessary, for instance, the reflecting mirror 3 can be positioned by bringing either one of ends of the reflecting mirror 3 in the X axis direction into contact with the reflecting-mirror mounting portion of the optical bench 10. Alternatively, the interval between two opposed wall surfaces in the X axis direction of the mirror mounting portion of the optical bench 10 may be set to be longer than the length of the reflecting mirror 3 in the X axis direction, thus preventing the reflecting mirror 3 and the optical bench 10 from being brought into direct contact with each other in the X axis direction.

Furthermore, a preload 53 in the direction perpendicular to the reflecting plane of the reflecting mirror 3 is applied to the reflecting mirror 3 to allow the reference plane 4 of the reflecting mirror 3 and the adhesion reference plane 25 of the external jig 24 to adhere. In this state, the adhesive storages 26 are filled with the UV adhesive 29 and ultraviolet rays are irradiated thereonto, thus bonding and fixing the reflecting mirror 3 and the optical bench 10 with high precision. In this case, the reflecting mirror 3 is bonded at two places in the vicinities of the approximate centers of a pair of opposed side faces of the reflecting mirror 3 approximately perpendicular to the X axis direction. The adhesive storages 26 are formed to have concave shapes in two opposed faces approximately perpendicular to the X axis direction of the reflecting-mirror mounting portion of the optical bench 10 so that the reflecting mirror 3 can be bonded and fixed at such places as described above.

FIGS. 2 and 3 show partial enlarged views illustrating the state in which the reflecting mirror 3 is bonded and fixed to the optical bench 10 in the vicinities of approximate centers of a pair of opposed side faces approximately orthogonal to the reflecting plane of the reflecting mirror 3. In the present embodiment, the UV adhesive 29 is applied at the approximate centers of respective side faces (more preferably, at the positions where the position of the UV adhesive 29 in the Z' axis direction approximately corresponds to a position in the Z' axis direction of the optical axis 30 of light incident on the reflecting mirror 3) and at positions approximately symmetrical with respect to a plane including an incident-light axis and a reflected-light axis. Therefore, even if the UV adhesive 29 expands or contracts due to the variation in environmental temperature, the optical head is not susceptible to this. In other words, the displacement magnitude of the reflecting mirror 3 in a horizontal direction (in an in-plane direction of a plane including the X axis and the Y axis), a vertical direction (the Z axis direction), and a lifting direction (a direction perpendicular to the reflecting plane 4 of the reflecting mirror 3) with respect to the optical bench 10 can be decreased considerably. As a result, the variation of the optical axis can be lessened, thus improving the quality of the optical head greatly.

The receiving/emitting optics 1 and the objective lens actuator 8 are mounted to the optical bench 10 to which the reflecting mirror 3 has been bonded and fixed according to the above-mentioned method, thus assembling the optical head.

The receiving/emitting optics 1 is fitted into the optical bench 10 and is fixed thereto with an adhesive. The mounting positions of the receiving/emitting optics 1 in the respective X axis, Y axis, and Z axis directions are specified by the fitting into the optical bench 10, and the receiving/emitting optics 1 is mounted so that the light receiving plane is positioned approximately midway between the focal points 21 and 22 of the light spots.

The objective lens actuator 8 is fixed to the optical bench 10 with the adhesive (for instance, a UV adhesive) 31 after the position and angle adjustments described later while the positioning holes 9a of the base 9 are maintained by external chucking pins (not shown in the figures).

A beam emitted from the semiconductor laser 1a in the receiving/emitting optics 1 is separated into a plurality of different beams of light by the hologram element. The plurality of different beams of light pass through the beam splitter 2a in the composite device 2 and then are reflected by the reflecting mirror 3, which are focused on the information recording medium 7 as a light spot 37 with a diameter of about 1 micron by the objective lens 5 fixed to the objective lens holder 6. A beam of light reflected by the beam splitter 2a in the composite device 2 enters receiving optics for monitoring the laser (not shown in the figures) to control a driving current for the semiconductor laser 1a.

Reflected light from the information recording medium 7 travels along the reverse path to be reflected and separated by the beam splitter 2a in the composite device 2, which is incident on the return mirror 2b and then the polarization separation element 2c.

The polarization direction of a beam emitted from the semiconductor laser 1a is set to be a direction parallel to the surface of the paper showing FIG. 5A. Incident light that has entered the polarization separation element 2c is separated into two beams of light whose polarized components are orthogonal to each other by the polarization separation element 2c, which are then incident on the light receiving areas 18 for an information signal.

Out of the reflected light from the information recording medium 7, a beam of light that has passed through the beam splitter 2a is separated into a plurality of beams of light by the hologram element, which are focused on the light receiving areas 16 for a focus error signal and the light receiving areas 17 for a tracking error signal.

Focus servo is carried out by a so-called SSD (spot size detection) method and tracking servo by a so-called push-pull method.

Further, by calculating the difference between the main beam 14 composed of P-polarized light and the main beam 15 composed of S-polarized light, an information signal of the information recording medium can be detected by a differential detection method. Furthermore, by calculating the sum of them, a prepit signal can be detected.

The focus error signal and the tracking error signal are adjusted by adjusting the objective lens actuator 8 in the X axis direction (a radial direction) and the Y axis direction (a tangential direction) after specifying its position in the Z axis direction by maintaining the positioning holes 9a of the base 9 by the external chucking pins (not shown in the figures) (see FIG. 7). They are adjusted so that the approximate equal outputs can be obtained from the light receiving areas 17 for a tracking error signal. The relative tilt adjustment between the information recording medium 7 and the objective lens 5 is carried out by rotating the objective lens actuator 8 in the radial direction (about the Y axis) θR and in the tangential direction (about the X axis) θT while the base 9 is maintained by the external chucking pins (not shown in the figures) as in the above (see FIG. 7). After the above-mentioned adjustments, the objective lens actuator 8 and the optical bench 10 are bonded and fixed with the adhesive 31 (see FIG. 8).

As described above, according to the first embodiment, the mounting position and angle at which the reflecting mirror 3 is mounted to the optical bench 10 are set using the adhesion reference plane 25 and the positioning wall 28 of the external jig 24. Therefore, the positioning walls and the adhesion reference planes for the reflecting mirror, which have been included in the conventional optical bench, are no longer required. Thus, the size and thickness of the optical head can be reduced. In addition, a high forming or processing precision is no longer required for the portion where the reflecting mirror 3 is mounted in the optical bench 10. As a result, the dimensional precision of the optical bench 10 can be relaxed considerably, thus lowering the cost of the optical head.

The reflecting mirror 3 is bonded and fixed to the optical bench 10 at two places in the vicinities of the approximate centers of a pair of opposed side faces of the reflecting mirror 3. Therefore, variations in angle and position of the reflecting mirror 3 are lessened, which are caused by expansion or contraction of the adhesive when the optical head is left in an environment. Consequently, the variation of the optical axis is lessened, thus achieving a highly-reliable optical head excellent in environmental variation characteristics.

In the first embodiment, the adhesion reference plane 25 was provided by using the upper face of the external jig 24 as a reference and the angle reference of the optical bench 10 was set by the reference plane 11, and the reflecting mirror 3 was bonded and fixed to the reference plane 11 with high mounting-angle precision. However, it goes without saying that the same effect can be obtained even when the reflecting mirror 3 is bonded and fixed by forming the adhesion reference plane 25 of the external jig 24 using other reference planes of the optical bench 10 or the two guide axes 32 as a reference.

Second Embodiment

Next, a second embodiment of the present invention is described with reference to FIG. 9.

Figure 9:
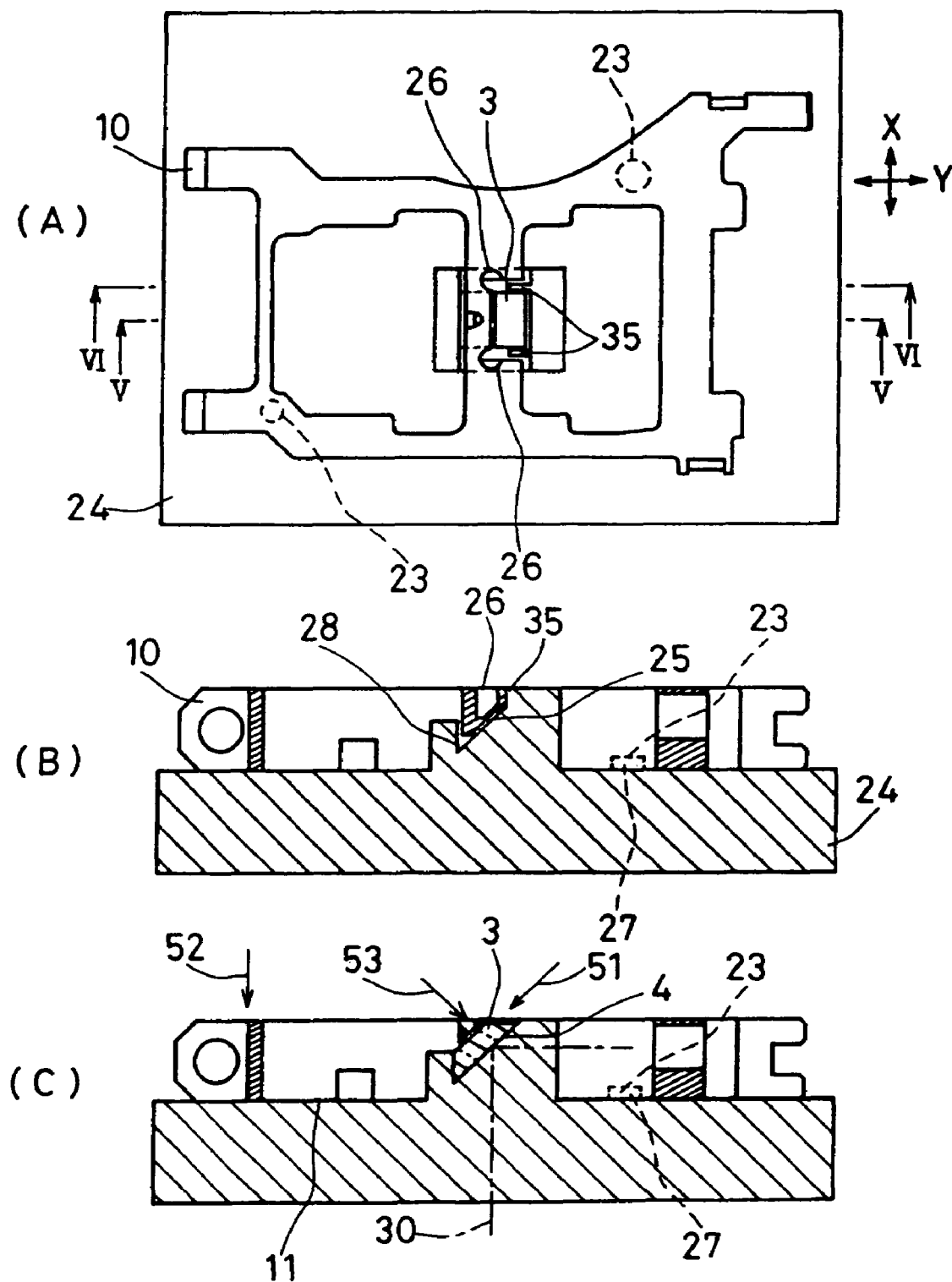
FIG. 9 shows schematic views illustrating a method of mounting a reflecting mirror to an optical bench according to a second embodiment of the present invention.

FIG. 9 shows schematic views illustrating a method of mounting a reflecting mirror to an optical bench according to the second embodiment. FIG. 9A is a plan view, FIG. 9B is a sectional view taken along line V—V and seen from the direction indicated by arrows shown in FIG. 9A, and FIG. 9C is a sectional view taken along line VI—VI and seen from the direction indicated by arrows shown in FIG. 9A. In FIG. 9, members having the same functions as those of the members shown in FIG. 1 are indicated with the same characters and their detailed descriptions are not repeated.

The present embodiment is different from the first embodiment in that a pair of positioning walls 35 opposing in an X axis direction is formed in an external jig 24 to position a reflecting mirror 3 in the X axis direction and the reflecting mirror 3 is allowed to contact with the positioning walls 35, thus also positioning the reflecting mirror 3 in the X axis direction by the external jig 24. Therefore, the reflecting mirror 3 does not come into contact with an optical bench 10.

According to the present embodiment, the dimensional precision (particularly, the processing precision of a mirror mounting portion that specified the position of the reflecting mirror 3 in the X axis by being brought into contact with the reflecting mirror 3 in the first embodiment) of a mirror mounting portion in the optical bench 10 can be further relaxed, thus achieving an optical bench at a lower cost. Furthermore, the optical bench 10 and the reflecting mirror 3 are not in contact with each other at all, thus achieving an optical head with higher reliability against the variation in thermal environment.

Third Embodiment

Figure 10:
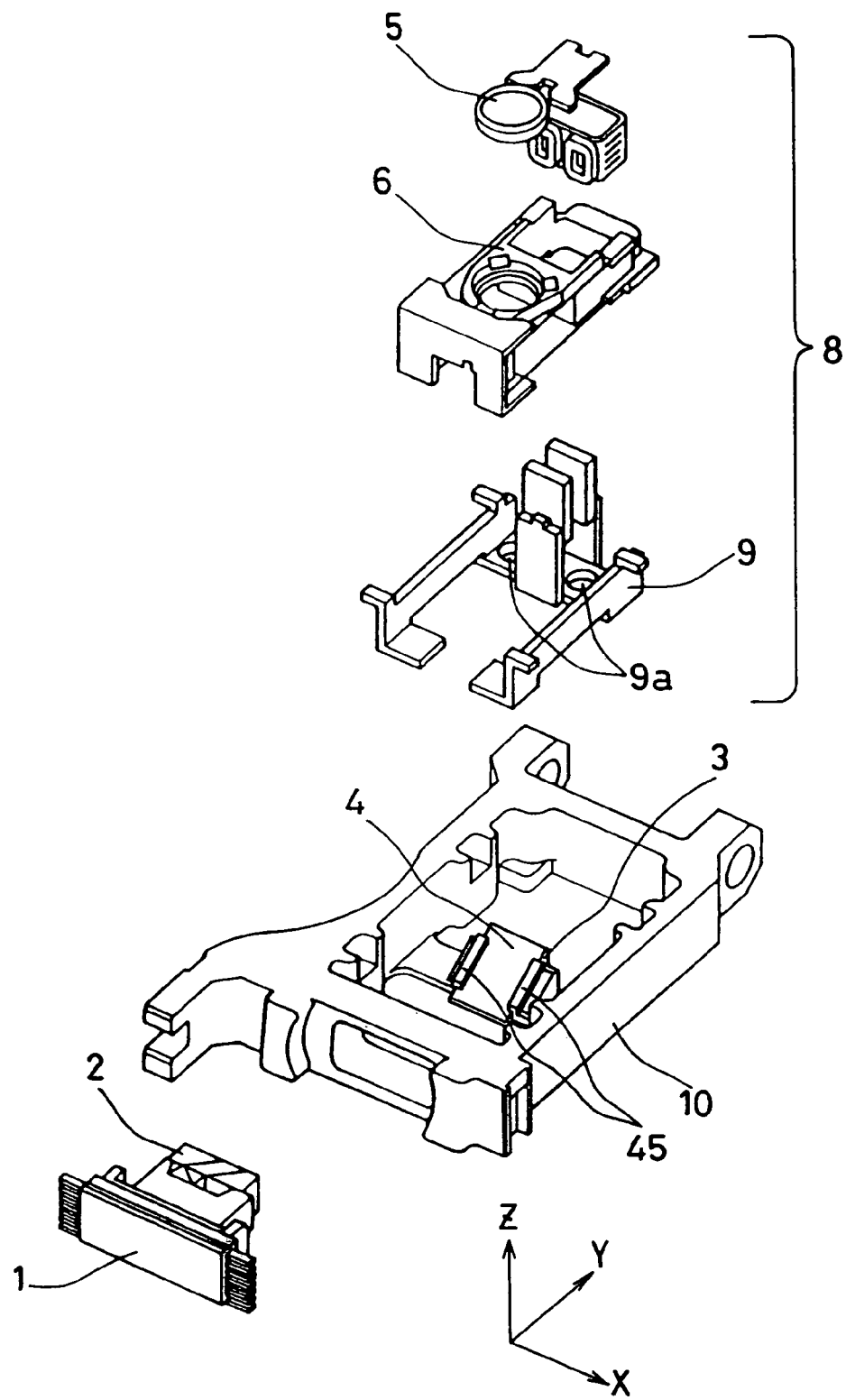
FIG. 10 is an exploded perspective view showing a schematic configuration of an optical head according to a third embodiment of the present invention.
Figure 13:
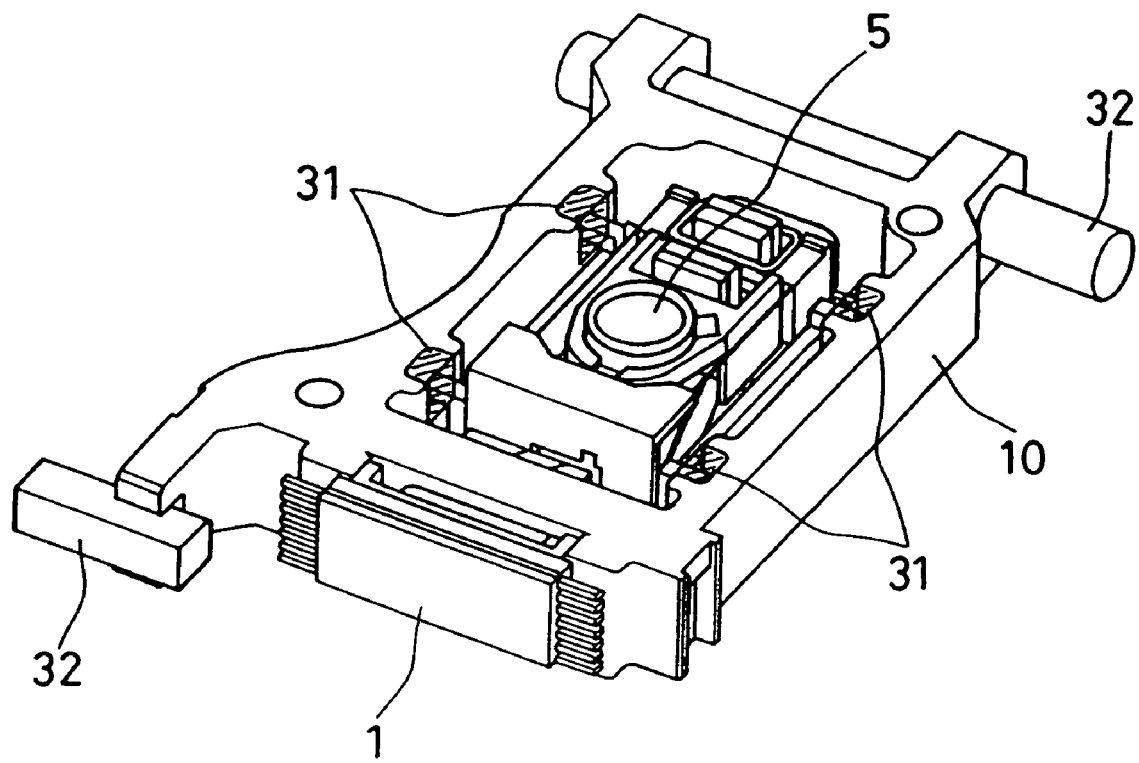
FIG. 13 is a perspective view showing a completed state of the whole optical head according to the third embodiment of the present invention.
Figure 14:
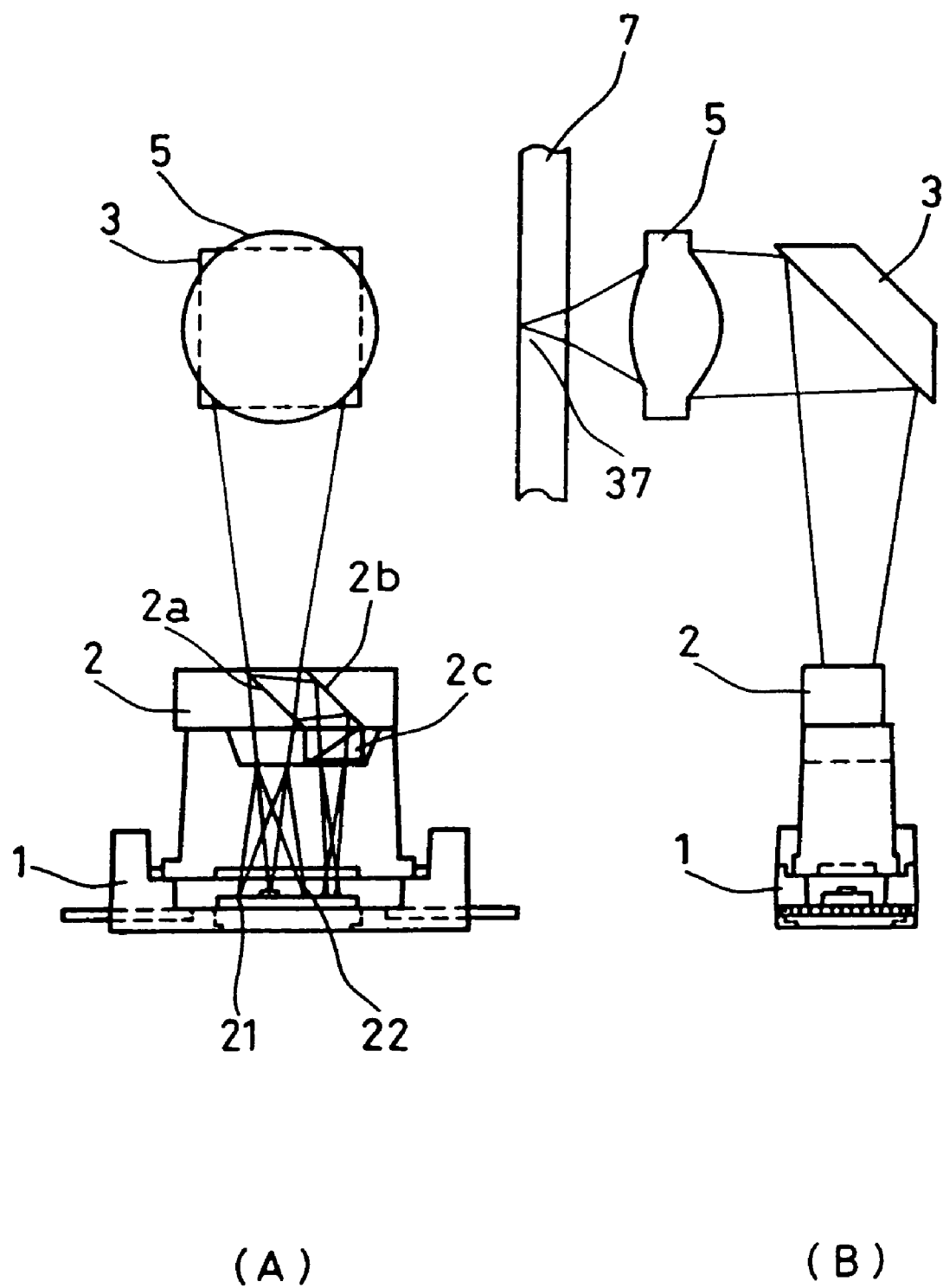
FIG. 14 shows optical-path diagrams illustrating optical paths in the optical head according to the third embodiment of the present invention.
Figure 15:
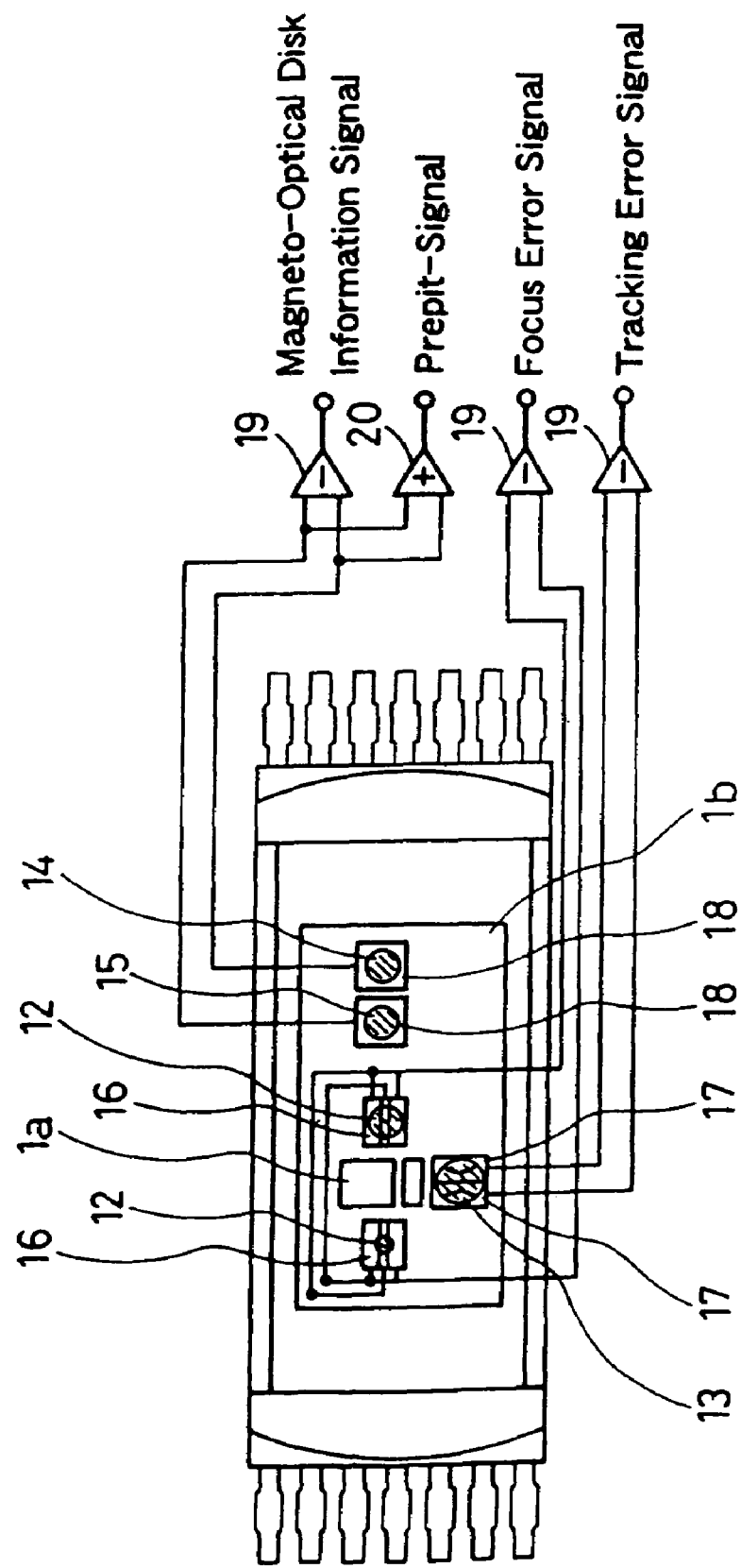
FIG. 15 is a signal circuit diagram showing a method of processing signals obtained by a multisplit photodetector in the optical head according to the third embodiment of the present invention.

FIG. 10 is an exploded perspective view showing a schematic configuration of an optical head according to a third embodiment. FIG. 11A is a sectional view of an optical bench and a reflecting mirror in a state immediately after integral molding, in a plane including an optical axis. FIG. 11B is an exploded perspective view showing a state in which the reflecting mirror is separated to show the configuration of the optical bench after the integral molding. FIG. 12 is an exploded perspective view showing a method of adjusting an objective lens actuator and the optical bench in the optical head according to the third embodiment. FIG. 13 is a perspective view showing a completed state of the whole optical head according to the third embodiment. FIG. 14 shows optical-path diagrams illustrating optical paths in the optical head according to the third embodiment. FIG. 14A is a front view and FIG. 14B is a side view. FIG. 15 is a signal circuit diagram showing a method of processing signals obtained by a multisplit photodetector in the optical head according to the third embodiment.

In FIGS. 10 to 15, numeral 1 indicates a receiving/emitting optics including a semiconductor laser 1a, a multisplit photodetector 1b, a hologram element, and the like, numeral 2 a composite device including a beam splitter 2a, a return mirror 2b, and a polarization separation element 2c, numeral 3 a reflecting mirror (a member for reflecting beams of light), numeral 4 a reflecting plane of the reflecting mirror 3, numeral 5 an objective lens fixed to an objective lens holder 6, numeral 7 an information recording medium (a magneto-optical disk) having a magneto-optical effect, numeral 8 an objective lens actuator for actuating the objective lens 5 in a plane-wobbling direction (a normal direction) and a radial direction of the information recording medium 7, numeral 9 a base as a component of the objective lens actuator 8, numeral 10 a resin optical bench, numeral 12 light spots for detecting a focus error signal, which are formed on the receiving/emitting optics 1, numeral 13 a light spot for detecting a tracking error signal, which is formed on the receiving/emitting optics 1, numeral 14 a main beam (P-polarized light) formed on the receiving/emitting optics 1, numeral 15 a main beam (S-polarized light) formed on the receiving/emitting optics 1, numeral 16 light receiving areas for a focus error signal, numeral 17 light receiving areas for a tracking error signal, numeral 18 light receiving areas for an information signal, numeral 19 subtractors, numeral 20 an adder, and numerals 21 and 22 focal points of the light spots for detecting a focus error signal. Further, numeral 30 denotes an optical axis, numeral 31 an adhesive for fixing the base 9 to the optical bench 10, numeral 32 guide axes for moving the optical bench 10, and numeral 37 a light spot focused on the information recording medium 7. Numeral 40 represents a mold for resin molding, numeral 41 a reference plane for the reflecting mirror, and numeral 42 a positioning wall for the reflecting mirror. The reference plane 41 and the positioning wall 42 are formed in the mold 40 to form a reflecting-mirror fixing portion. Numeral 45 denotes first holding parts formed in the optical bench 10 and numeral 46 a second holding part formed in the optical bench 10.

The third embodiment of the present invention with the above-mentioned configuration is described as follows.

Figure 11:
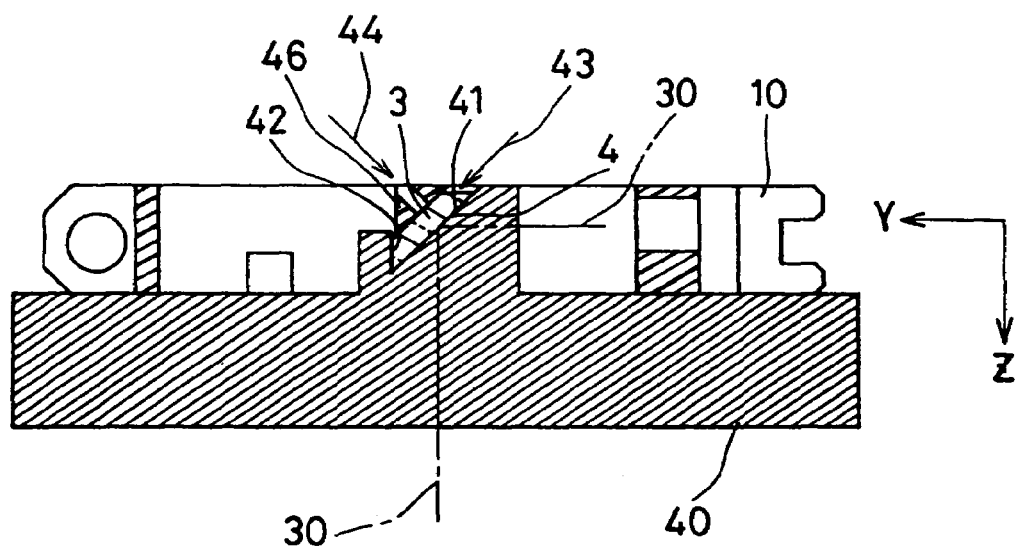
FIG. 11 includes FIG. 11A showing a sectional view of an optical bench and a reflecting mirror in a state immediately after integral molding, in a plane including an optical axis, in the third embodiment of the present invention and FIG. 11B showing an exploded perspective view illustrating a state in which the reflecting mirror is separated to show the configuration of the optical bench after the integral molding.
Figure 11:
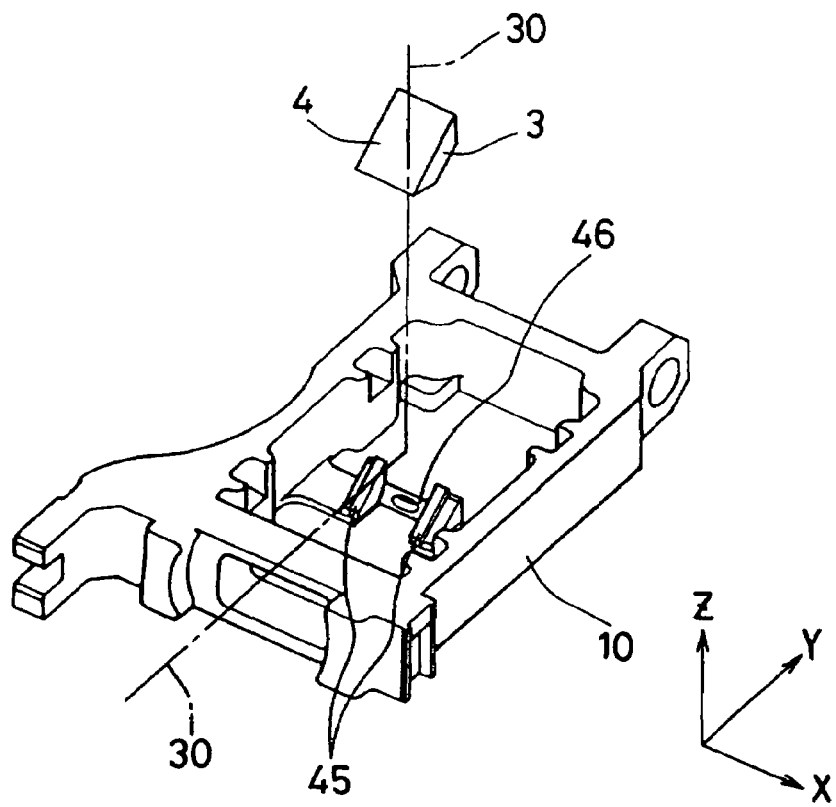
Figure 12:
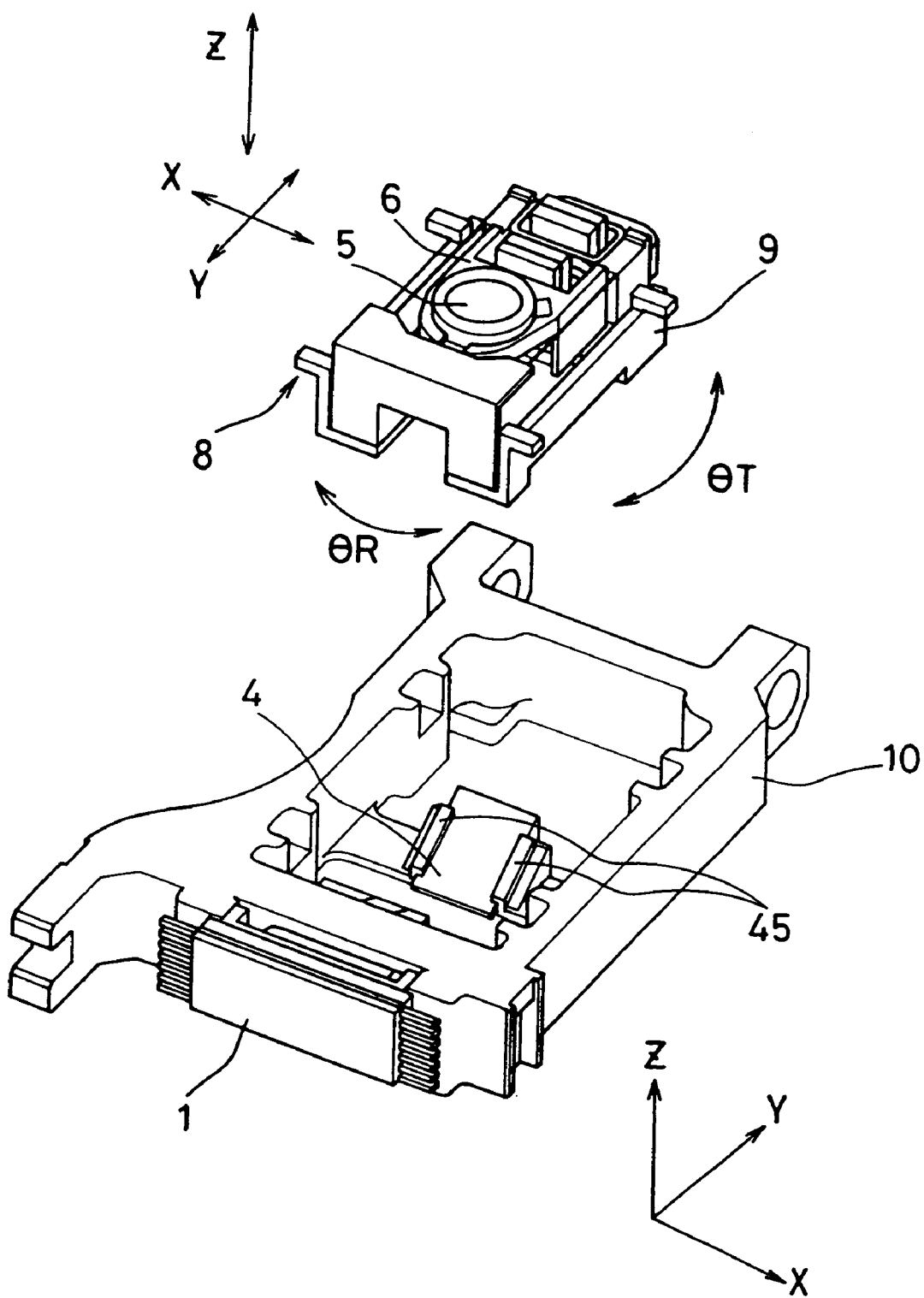
FIG. 12 is an exploded perspective view showing a method of adjusting an objective lens actuator and the optical bench in the optical head according to the third embodiment of the present invention.

For convenience in the following description, as shown in FIGS. 10 to 12, an X axis (in a radial direction of the magneto-optical disk 7), a Y axis (in a tangential direction of the magneto-optical disk 7), and a Z axis (in a normal direction of the magneto-optical disk 7) are set as orthogonal coordinate axes.

The reflecting mirror 3 as a member for reflecting beams of light is formed of a flat-plate base made of resin or glass and a reflecting plane 4 on its one face. The reflecting plane 4 is formed of a reflection film by, for example, aluminum evaporation. However, the reflecting plane 4 is not limited to this and may be formed of an evaporated film of chromium, dielectric, or the like as long as it is an evaporated film having excellent aberration characteristics for reflected beams of light. It is preferred to apply a well-known AR (anti-reflection) coating on the surface of the reflecting plane 4.

The reflecting mirror 3 thus formed is placed on the mold 40 for resin molding that is provided with the reflecting-mirror fixing portion (see FIG. 11A). The reflecting-mirror fixing portion includes the reference plane 41 that comes into contact with the reflecting plane 4 of the reflecting mirror 3 and the positioning wall 42 that comes into contact with a lower end face of the reflecting mirror 3. The angle error of the reference plane 41 and the position in the Z axis direction of the intersection of the reference plane 41 and the positioning wall 42 are controlled with high precision.

The reflecting mirror 3 is placed on the reflecting-mirror fixing portion of the mold 40 with the reflecting plane 4 of the reflecting mirror 3 facing the reference plane 41. Then, a preload 43 in a direction parallel to the reflecting plane 4 is applied to the reflecting mirror 3 to bring the lower end face of the reflecting mirror 3 into contact with the positioning wall 42, thus positioning the reflecting mirror 3 in the Z axis direction. Further, a preload 44 is applied from the back face of the reflecting mirror 3 to allow the reflecting plane 4 to adhere to the reference plane 41, thus obtaining a constant mounting angle of the reflecting mirror 3. In this state, a mold that is not shown in the figures is allowed to adhere to the mold 40 and a resin is injected into a cavity formed in the inside. When the molds are separated, a resin optical bench 10 in which the reflecting mirror 3 is integrally molded (insert molding) as shown in FIG. 1A is obtained. As is apparent from the above, the mounting angle and the position in the Z axis direction of the reflecting mirror 3 with respect to the optical bench 10 are determined by the reference plane 41 and the positioning wall 42 of the mold 40.

As a resin material of the optical bench 10, for example, PPS (polyphenylene sulfide) can be used. However, the resin material is not limited to this and may be, for example, acrylic, polycarbonate, liquid crystal polymer, or polyolefin resin, or other common resins.

In the integral molding, usually the temperature of the resin material is about 200° C. to 400° C. On the other hand, when the reflecting mirror 3 is made of a glass material, the softening point of the glass is at least 500° C. Therefore, the problem of deterioration in performance of the reflecting mirror 3 including the aluminum reflection film and the AR coating provided as required on the reflecting plane 4 is not caused in the integral molding.

FIG. 11B is an exploded perspective view showing a state in which the reflecting mirror 3 is separated so that the configuration of the portion where the reflecting mirror 3 is mounted in the optical bench 10 thus integrally molded can be seen. As shown in FIG. 10 and FIG. 11B, the reflecting mirror 3 is maintained in the optical bench 10 by the first holding parts 45 and the second holding part 46 that have been integrally molded in the optical bench 10. The first holding parts 45 maintain the reflecting mirror 3 by both the side faces of the reflecting mirror 3 in the X axis direction and at both ends of the reflecting plane 4 in the X axis direction. In addition, the second holding part 46 maintains the reflecting mirror 3 by the back surface of the reflecting mirror 3. The reflecting mirror 3 is fixed to the optical bench 10 firmly with high precision without unstableness, looseness, or the like by the holding powers of the first holding parts 45 and the second holding part 46. As described above, no parts for holding upper and lower faces of the reflecting mirror 3 in the Z axis direction are formed, thus reducing the thickness of the optical bench 10.

To the optical bench 10 in which the reflecting mirror 3 has been integrally molded according to the above-mentioned method, the receiving/emitting optics 1 provided with the composite device 2 and the objective lens actuator 8 are mounted, thus assembling an optical head.

The receiving/emitting optics 1 is fitted into the optical bench 10 and is fixed thereto with an adhesive. The mounting positions of the receiving/emitting optics 1 in the respective X axis, Y axis, and Z axis directions are specified by the fitting into the optical bench 10, and the receiving/emitting optics 1 is mounted so that the light receiving plane is positioned approximately midway between the focal points 21 and 22 of light spots.

The objective lens actuator 8 is fixed to the optical bench 10 with the adhesive (for instance, a UV adhesive) 31 after the position and angle adjustments described later while the positioning holes 9a of the base 9 are maintained by external chucking pins (not shown in the figures).

A beam emitted from the semiconductor laser 1a in the receiving/emitting optics 1 is separated into a plurality of different beams of light by the hologram element. The plurality of different beams of light pass through the beam splitter 2a in the composite device 2 and then are reflected by the reflecting mirror 3, which are focused on the information recording medium 7 as a light spot 37 with a diameter of about 1 micron by the objective lens 5 fixed to the objective lens holder 6. A beam of light reflected by the beam splitter 2a in the composite device 2 enters receiving optics for monitoring the laser (not shown in the figures) to control a driving current for the semiconductor laser 1a.

Reflected light from the information recording medium 7 travels along the reverse path to be reflected and separated by the beam splitter 2a in the composite device 2, which is incident on the return mirror 2b and then the polarization separation element 2c.

The polarization direction of a beam emitted from the semiconductor laser 1a is set to be a direction parallel to the surface of the paper showing FIG. 14A. Incident light that has entered the polarization separation element 2c is separated into two beams of light whose polarized components are orthogonal to each other by the polarization separation element 2c, which are then incident on the light receiving areas 18 for an information signal.

Out of the reflected light from the information recording medium 7, a beam of light that has passed through the beam splitter 2a is separated into a plurality of beams of light by the hologram element, which are focused on the light receiving areas 16 for a focus error signal and the light receiving areas 17 for a tracking error signal.

Focus servo is carried out by a so-called SSD method and tracking servo by a so-called push-pull method.

Further, by calculating the difference between the main beam 14 composed of P-polarized light and the main beam 15 composed of S-polarized light, an information signal of the information recording medium can be detected by a differential detection method. Furthermore, by calculating the sum of them, a prepit signal can be detected.

The focus error signal and the tracking error signal are adjusted by adjusting the objective lens actuator 8 in the X axis direction (a radial direction) and the Y axis direction (a tangential direction) after specifying its position in the Z axis direction by maintaining the positioning holes 9a of the base 9 by the external chucking pins (not shown in the figures) (see FIG. 12). They are adjusted so that the approximate equal outputs can be obtained from the light receiving areas 17 for a tracking error signal. The relative tilt adjustment between the information recording medium 7 and the objective lens 5 is carried out by rotating the objective lens actuator 8 in the radial direction (about the Y axis) θR and in the tangential direction (about the X axis) θT while the base 9 is maintained by the external chucking pins (not shown in the figures) as in the above (see FIG. 12). After the above-mentioned adjustments, the objective lens actuator 8 and the optical bench 10 are bonded and fixed with the adhesive 31 (See FIG. 13).

As described above, according to the third embodiment, since the optical bench 10 and the reflecting mirror 3 are integrally molded, it is possible to omit a series of steps of, in assembling and adjusting a conventional optical head: positioning the reflecting mirror 3 with respect to the optical bench 10; applying a preload to the reflecting mirror 3 toward the optical bench 10; and bonding them. Therefore, the production process is shortened, thus achieving a considerable cost reduction.

The positioning walls and the adhesion reference planes for the reflecting mirror are no longer necessary, which have been provided in the conventional optical bench. When the reflecting-mirror fixing portion in the mold 40 is formed with high precision, the reflecting mirror 3 can be integrated into the optical bench 10 with high precision. As a result, the variance of the optical axis of the optical head can be lessened greatly, thus obtaining an optical head with high and stable precision at a low cost.

Since the optical bench 10 and the reflecting mirror 3 are fixed without using an adhesive, the relative displacement in position and angle between the optical bench 10 and the reflecting mirror 3 is not caused easily by expansion or contraction when the environmental temperature varies, thus achieving a highly-reliable optical head excellent in environmental variation characteristics.

Further, it is not necessary to provide a portion for positioning the reflecting mirror 3 and adhesive storages in the optical bench 10. Therefore, the size and thickness of the optical head can be reduced considerably.

In the above example, the first holding parts 45 in the optical bench 10, which maintain the reflecting mirror 3, are formed only on both sides of the reflecting mirror 3 in the X axis direction and are not formed on both sides of the reflecting mirror 3 in the Z axis direction. However, the first holding parts 45 can be formed so as to hold the entire circumference of the reflecting mirror 3. In this case, the thickness of the optical head increases slightly, but the power of holding the reflecting mirror 3 increases.

In the above example, the reflecting mirror 3 was maintained by the first holding parts 45 and the second holding part 46 of the optical bench 10. However, the reflecting mirror 3 may be maintained by grooves (for instance, with a V-shaped cross section) formed in both the opposed side faces (for example, in the X axis direction). In this case, the second holding part that maintains the reflecting mirror 3 by the back face is no longer necessary.

Fourth Embodiment

Figure 16:
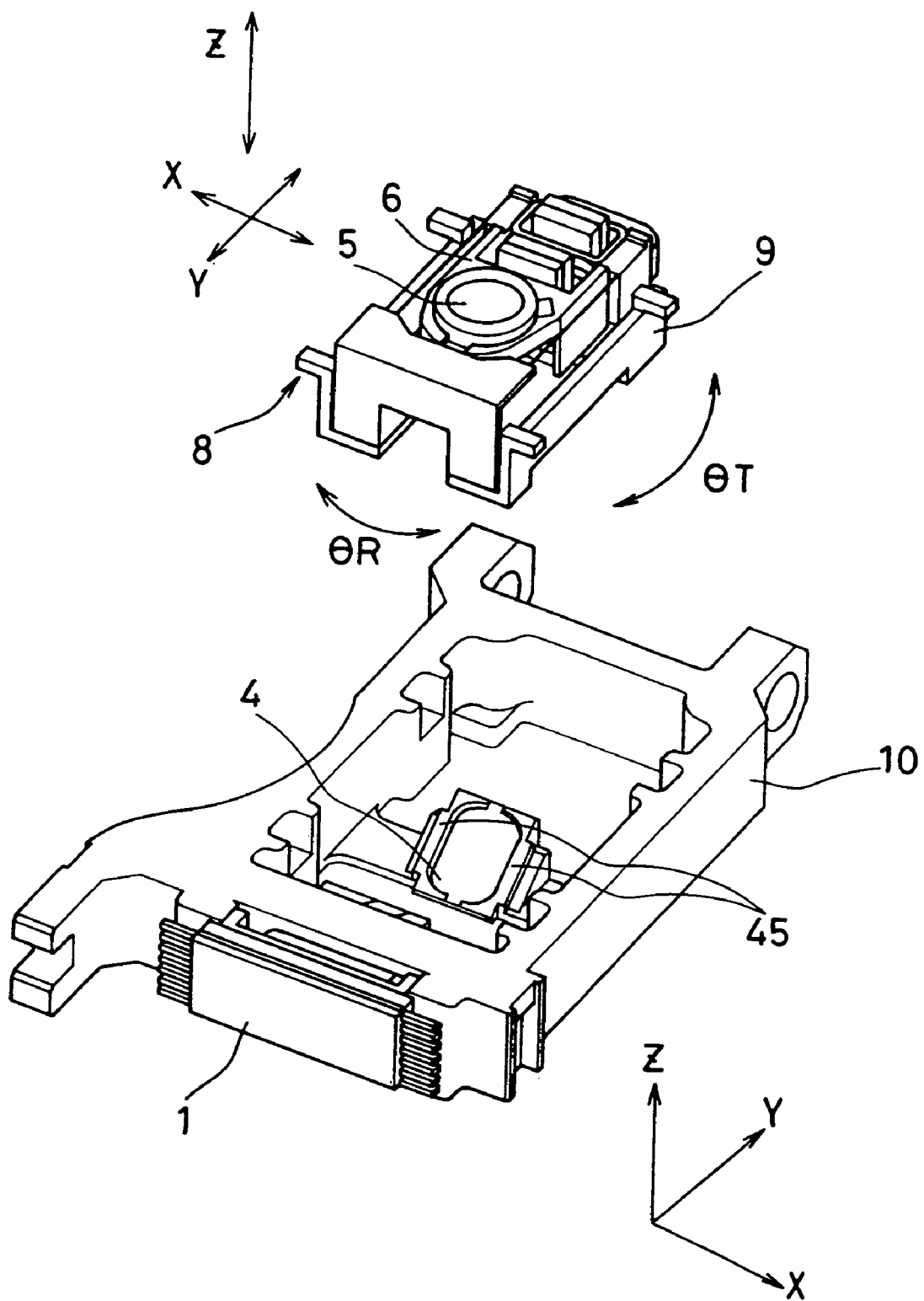
FIG. 16 is an exploded schematic perspective view of an optical head according to a fourth embodiment of the present invention.

Next, a fourth embodiment is described with reference to FIG. 16. FIG. 16 is an exploded schematic perspective view of an optical head according to the fourth embodiment. Members having the same functions as those of the members shown in FIGS. 10 to 15 are indicated with the same characters and their detailed descriptions are not repeated.

The present embodiment is different from the third embodiment in the following two points. The first difference resides in that the quantity of light reflection is reduced by using a black resin material for an optical bench 10. The second difference resides in that the four corners of a reflecting plane 4 of a reflecting mirror 3 with an approximate rectangular shape are covered with first holding parts 45 so that the reflecting plane 4 is exposed in an approximate circular or elliptical shape, thus reducing the reflected light (stray light) from the four corners of the reflecting plane 4 considerably.

According to the present embodiment, so-called stray light can be reduced considerably, which causes offset in a servo signal by being reflected from the four corners of the reflecting plane 4, passing through the outside of an objective lens holder 6, being reflected by an information recording medium 7, and being incident on a light receiving plane of a multisplit photodetector 1b again. Consequently, a higher-performance optical head and disk recording/reproducing apparatus can be obtained.

In the present embodiment, the shape of the exposed portion of the reflecting plane 4, which is defined by the first holding parts 45, was an approximate circular or elliptical shape. However, the shape of the exposed portion of the reflecting plane 4 is not limited to this as long as the four corners of the reflecting plane 4 are covered with a resin.

In the present embodiment, in order to lessen the reflection of light at the four corners of the reflecting plane 4, the whole optical bench 10 including the first holding parts 45 covering the four corners was formed of a black resin. However, the optical bench 10 may be formed by a so-called two color formation so that only the first holding members 45 are formed of the black resin and the other portion of the optical bench 10 is formed of a resin with a different color. However, when the whole optical bench 10 is formed of the black resin, a greater effect of reducing stray light can be obtained. The color of the resin is not limited to black and other colors may be used as long as the quantity of light reflection can be reduced.

Instead of or in addition to the use of a resin color such as black or the like, which can reduce the quantity of reflection, a surface treatment such as a satin treatment (for instance, a matting treatment) may be carried out on the surface to cause scattering of light, thus reducing the stray light. It is enough to carry out such a surface treatment on the surface of the first holding parts 45 covering the four corners of the reflecting plane 4. However, when the same treatment is carried out on the other portion of the optical bench 10, the stray light can be further reduced.

Moreover, not only the four corners but the entire circumference of the reflecting plane 4 may be covered by the first holding parts 45. This can further reduce stray light.

Fifth Embodiment

Figure 17:
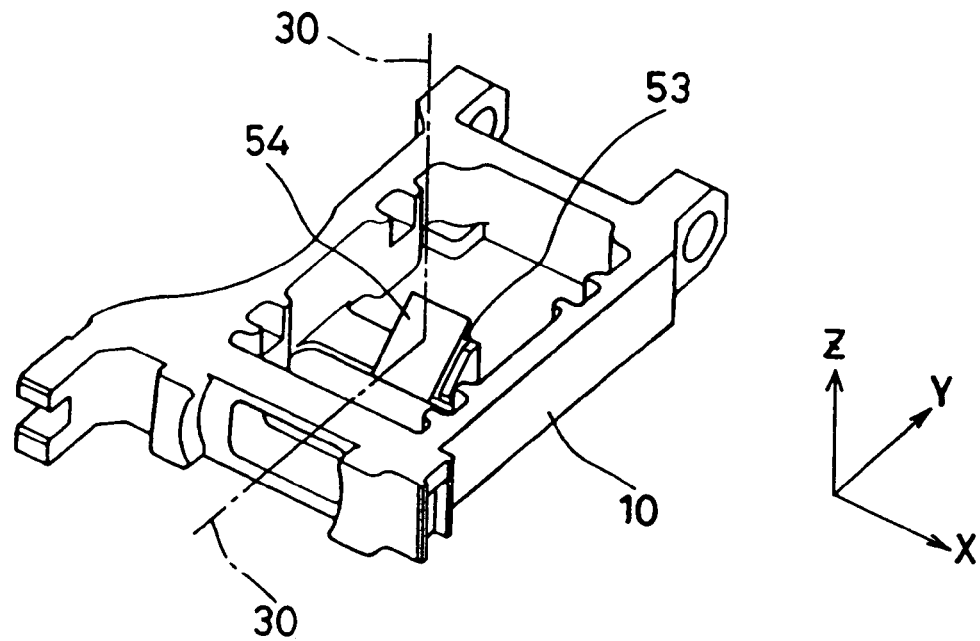
FIG. 17 shows schematic views of an optical bench provided with a member for reflecting beams of light according to a fifth embodiment of the present invention.
Figure 17:
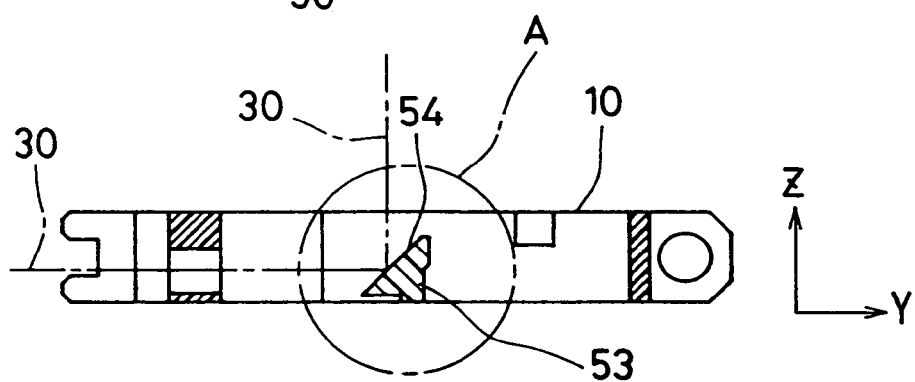
Figure 17:
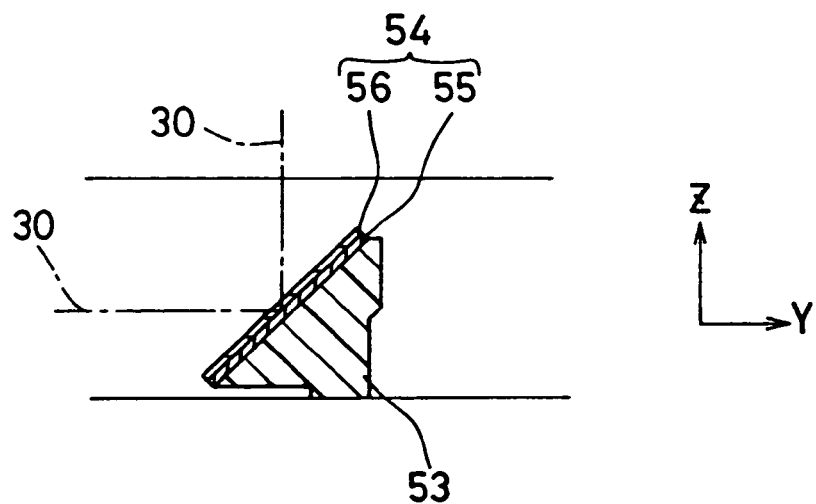

A fifth embodiment of the present invention is described with reference to FIG. 17. FIG. 17 shows schematic views of an optical bench provided with a member for reflecting beams of light according to the fifth embodiment. FIG. 17A is a perspective view, FIG. 17B is a sectional view in a plane including an optical axis, and FIG. 17C is a partial enlarged sectional view of a portion A shown in FIG. 17B. Members having the same functions as those of the members shown in FIGS. 10 to 15 are indicated with the same characters and their detailed descriptions are not repeated.

The present embodiment is different from the third and fourth embodiments in that without using a reflecting mirror 3 as in the third and fourth embodiments, a member for reflecting beams of light is provided by forming a reflecting plane 54 on the surface of a reflecting plane base 53 molded at the same time the resin molding of an optical bench 10 has been carried out. The reflecting plane 54 is formed of a reflection film 55 on the surface of the reflecting plane base 53 and an AR (anti-reflection) coating layer 56 thereon. The reflection film 55 is formed by, for example, aluminum evaporation. However, the reflection film 55 is not limited to this and may be an evaporated film of chromium, dielectric, or the like as long as the evaporated film has excellent aberration characteristics for reflected beams of light. The AR coating layer 56 has an antioxidative function and an antireflective function. The AR coating layer 56 is made of, for example, silicon, magnesium fluoride, or the like and is formed by evaporation. The evaporation temperature of the reflection film 55 and the AR coating layer 56 is an ordinary temperature, thus causing no problem of deterioration in performance of the member for reflecting beams of light due to the evaporation.

According to the present embodiment, the reflecting plane base 53 also is molded at the same time the optical bench 10 is molded. Therefore, the step of positioning the reflecting mirror 3 and the preload applied to the reflecting mirror 3 in molding as in the third and fourth embodiments are no longer required. In addition, the reflecting plane base 53 is integrally molded using the same material as that of the optical bench 10. As a result, the forming precision of the reflecting plane 54 is improved and is stabilized. The environmental stability against temperature variations is further improved, thus achieving a highly-reliable optical head that is resistant to the variation in thermal environment. Moreover, since the reflecting-mirror holding parts are no longer required, the thickness and size of the optical head can be reduced.

As a resin material of the optical bench 10, for instance, PPS (polyphenylene sulfide) can be used. However, the resin material is not limited to this and may be, for example, acrylic, polycarbonate, liquid crystal polymer, polyolefin resin, or other common resins.

The portion of the reflecting plane base 53 and the other portion of the optical bench 10 may be formed of different resin materials (so-called two color formation). For example, the reflecting plane base 53 may be formed of polycarbonate, acrylic, or polyolefin resin, and the other portion may be formed of PPS, liquid crystal polymer, or other common resins. This allows the surface smoothness of the reflecting plane 54 and the mechanical strength of the optical bench 10 to be compatible.

Sixth Embodiment

Figure 18:
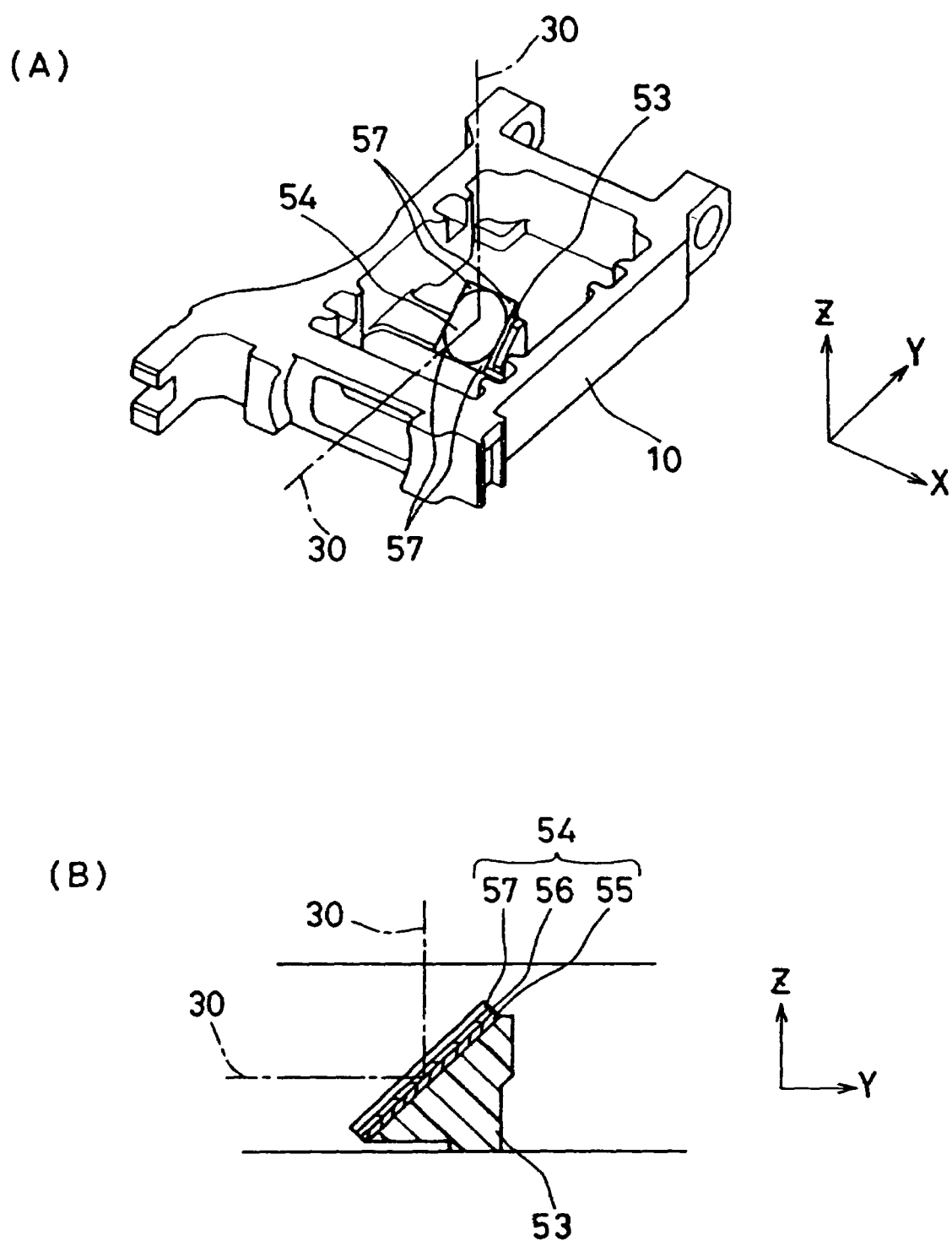
FIG. 18 shows schematic views of an optical bench provided with a member for reflecting beams of light according to a sixth embodiment of the present invention.

Next, a sixth embodiment is described with reference to FIG. 18. FIG. 18 shows schematic views of an optical bench provided with a member for reflecting beams of light according to the sixth embodiment. FIG. 18A is a perspective view, and FIG. 18B is a partial enlarged sectional view of the member for reflecting beams of light, in a plane including an optical axis. Members having the same functions as those of the members shown in FIGS. 10 to 15 are indicated with the same characters and their detailed descriptions are not repeated.

The present embodiment is different from the fifth embodiment in that a photoabsorption film 57 is formed on an AR coating layer 56 of a member for reflecting beams of light. The photoabsorption film 57 is formed only on the four corners of a reflecting plane 54 as shown in FIG. 18A.

As the photoabsorption film 54, well-known films can be used. However, the photoabsorption film 54 can be formed using tantalum oxide, chromium oxide, metallic oxide of, for example, cobalt, or the like by a method such as evaporation.

According to the present embodiment, so-called stray light can be reduced considerably, which causes offset in a servo signal by being reflected from the four corners of the reflecting plane 54, passing through the outside of an objective lens holder 6, being reflected by an information recording medium 7, and being incident on a light receiving plane of a multisplit photodetector 1b again. Consequently, a higher-performance optical head and disk recording/reproducing apparatus can be obtained.

Seventh Embodiment

Figure 19:
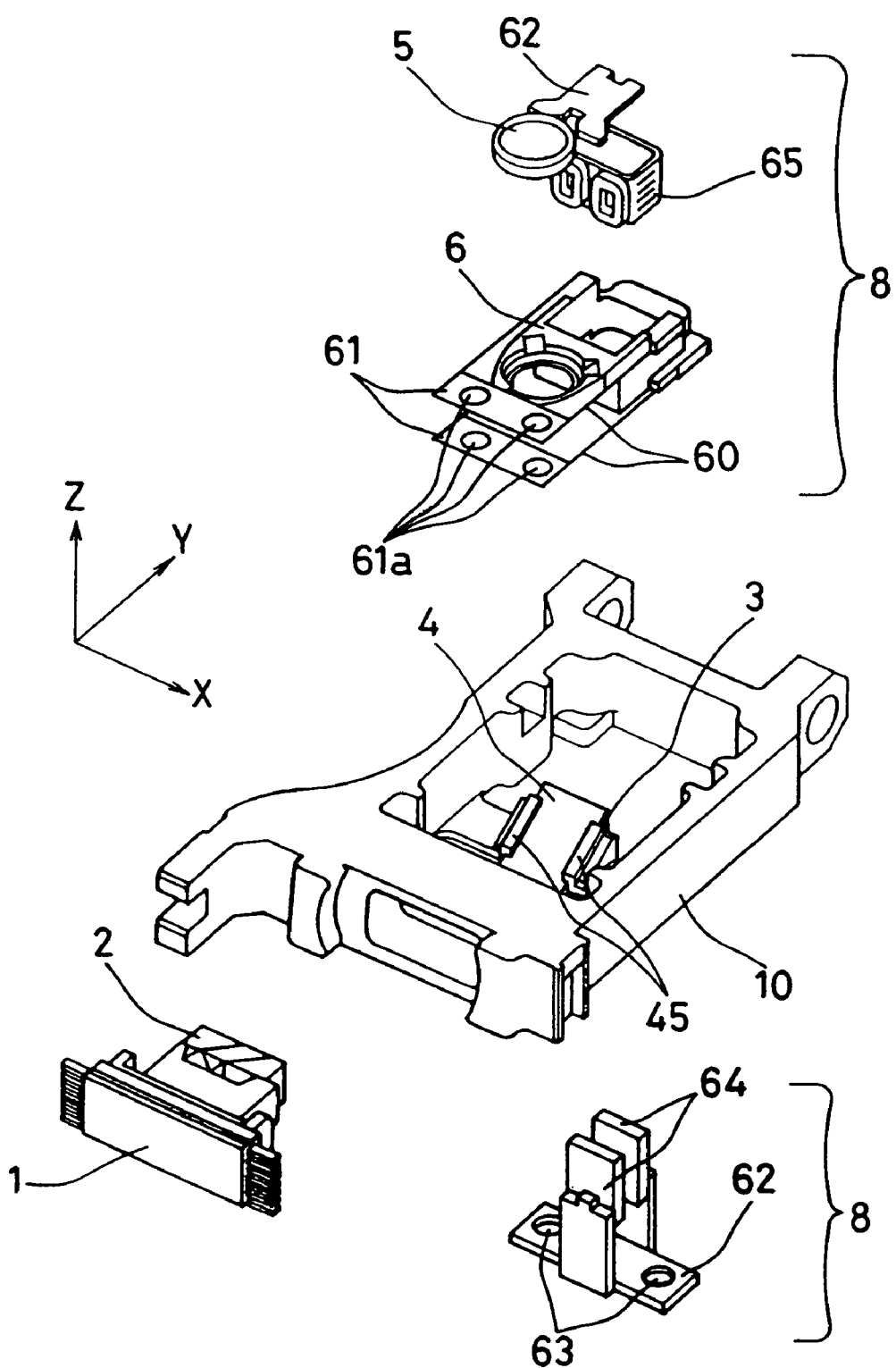
FIG. 19 is an exploded perspective view showing a schematic configuration of an optical head according to a seventh embodiment of the present invention.
Figure 20:
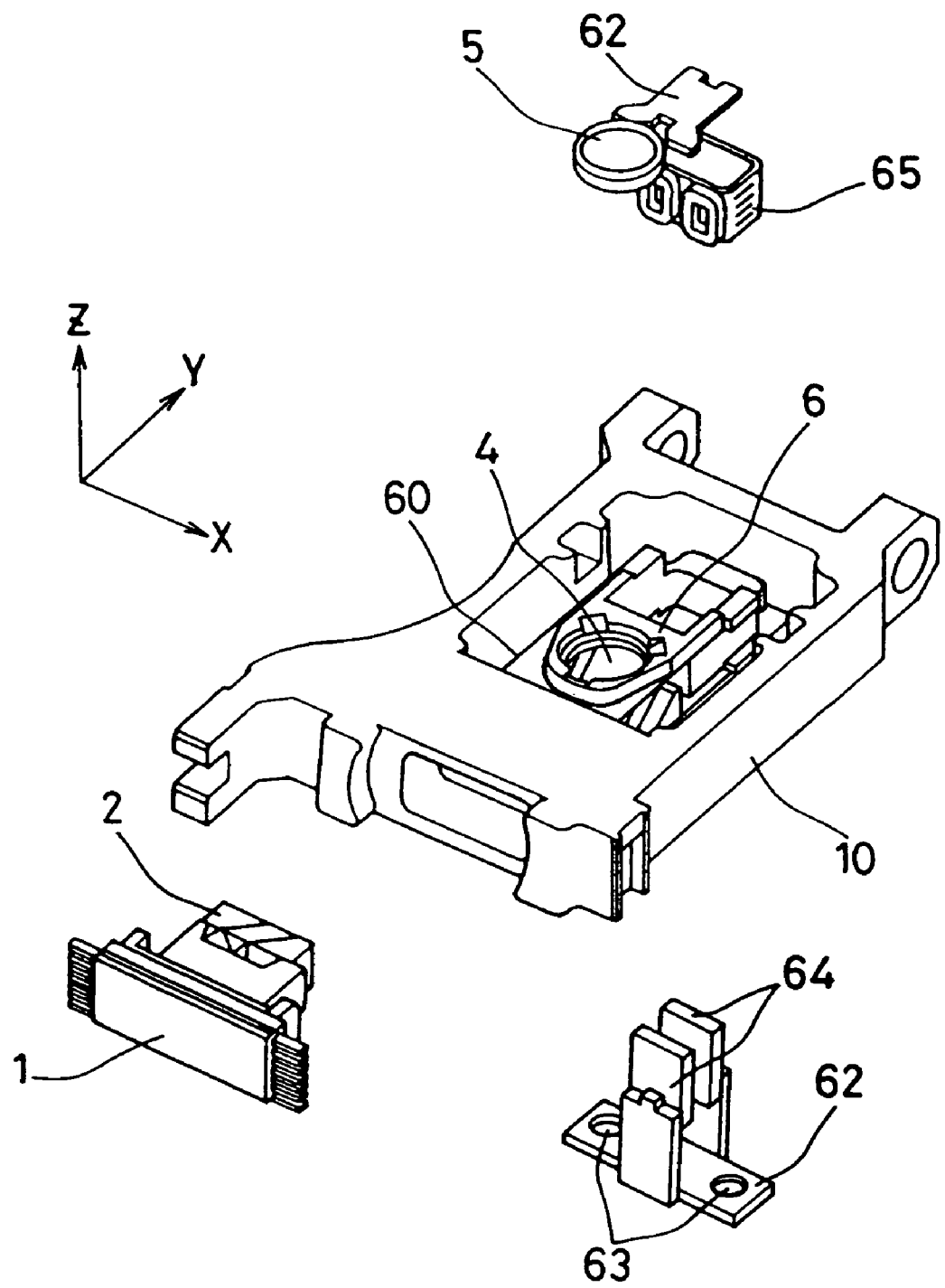
FIG. 20 is another exploded perspective view showing the schematic configuration of the optical head according to the seventh embodiment of the present invention.
Figure 21:
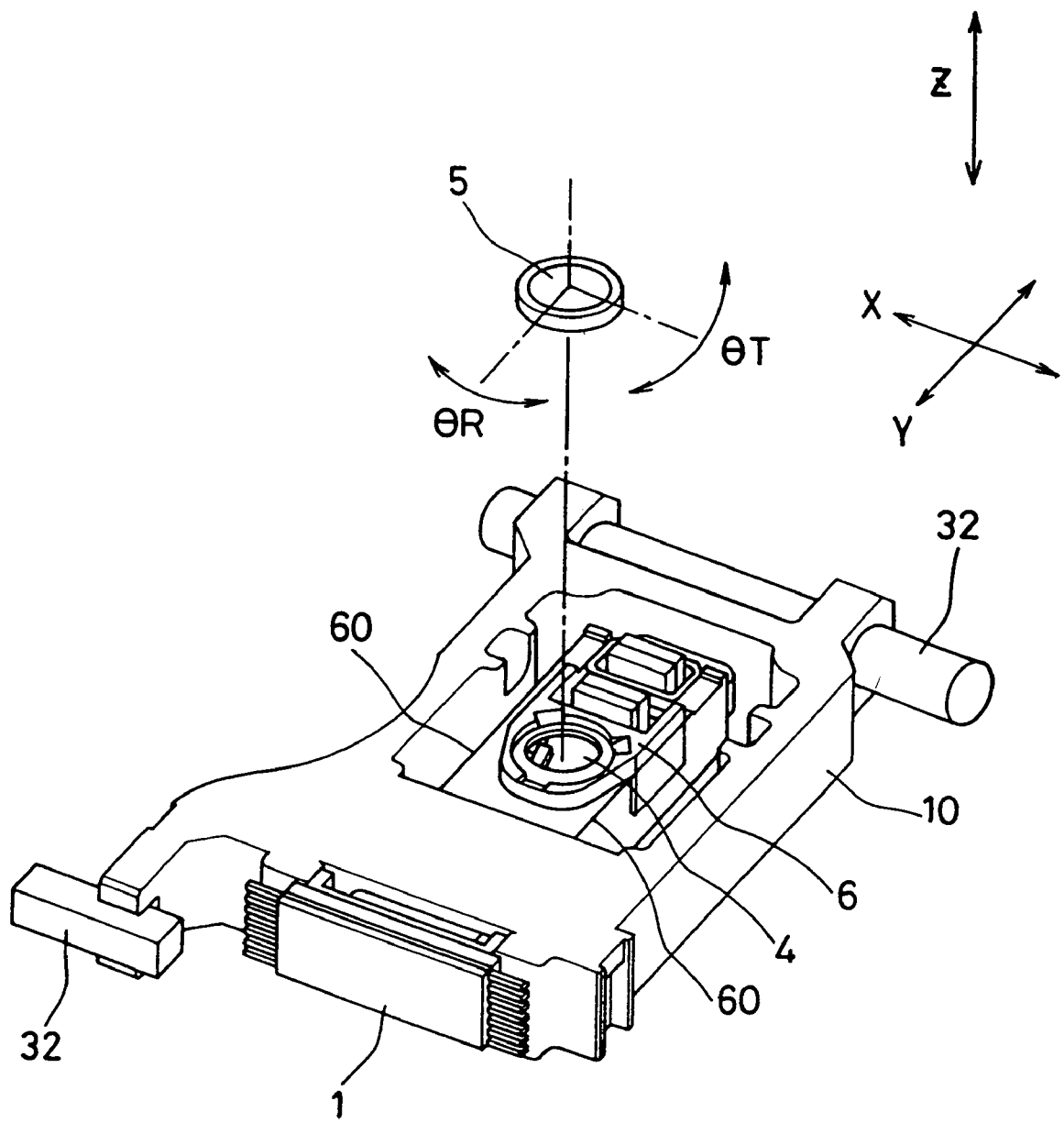
FIG. 21 is a perspective view showing a method of adjusting the optical head according to the seventh embodiment of the present invention.

Next, a seventh embodiment is described with reference to FIGS. 19 to 21. FIGS. 19 and 20 are exploded perspective views showing a schematic configuration of an optical head according to the seventh embodiment. FIG. 21 is a perspective view showing a method of adjusting the optical head according to the seventh embodiment. Members having the same functions as those of the members shown in FIGS. 10 to 15 are indicated with the same characters and their detailed descriptions are not repeated.

In FIGS. 19 to 21, numeral 60 indicates suspensions for supporting an objective lens holder 6 movably in a normal direction (a plane-wobbling direction) and a radial direction of an information recording medium 7, numeral 61 joints for fixing the suspensions 60 to an optical bench 10, numeral 61a positioning holes formed in the joints 61, numeral 62 a yoke, numeral 63 bonding holes for bonding and fixing the yoke to the optical bench 10, numeral 64 magnets, and numeral 65 a coil. The suspensions 60 and the joints 61 are formed of thin metal plates to be one component. The suspensions 60 are elastically deformed, thus displacing the objective lens holder 6. All of the objective lens holder 6, the suspensions 60, the joints 61, the yoke 62, the bonding holes 63, the magnets 64, and the coil 65 are components of an objective lens actuator 8.

The present embodiment is different from the third to sixth embodiments in that the optical bench 10, the objective lens holder 6, a reflecting mirror 3, and the suspensions 60 are integrally molded. In other words, a mold used for resin molding is provided with a suspension fixing portion in addition to the reflecting-mirror fixing portion described in the third embodiment. Further, the mold is formed in a shape that enables the objective lens holder 6 to be molded in addition to the optical bench 10. As in the third embodiment, the reflecting mirror 3 is placed on the mold and the suspensions 60 including the joints 61 also are placed in the mold. The suspensions 60 are positioned in the mold using the positioning holes 61a. In this state, when a resin for molding is injected, the reflecting mirror 3, the suspensions 60, the objective lens holder 6, and the optical bench 10 can be integrally molded (FIG. 20). After that, a receiving/emitting optics 1 provided with a composite device 2, the yoke 62, the magnets 64, the coil 65, and an objective lens 5 are incorporated, thus completing an optical head.

The optical head according to the present embodiment is adjusted as follows. As shown in FIG. 21, while the objective lens 5 is maintained at a specified height in the Z axis direction by an external jig (not shown in the figures), its position in an X-Y plane and tilt of two axes in θT and θR directions are adjusted. After that, the objective lens 5 is bonded and fixed to the objective lens holder 6.

According to the present embodiment, in molding the optical bench 10, not only the reflecting mirror 3 but also the objective lens holder 6 and the suspensions 60 are integrally molded. Therefore, in addition to the effect obtained in the third embodiment, the number of components included in the optical head and the number of assembly steps can be reduced greatly. As a result, an optical head can be provided at a lower cost.

In the seventh embodiment, the suspensions 60 may be provided with a damper for decreasing resonance, which is not shown in the figures. It goes without saying that a damper of, for example, gel or the like can be used.

Figure 22:
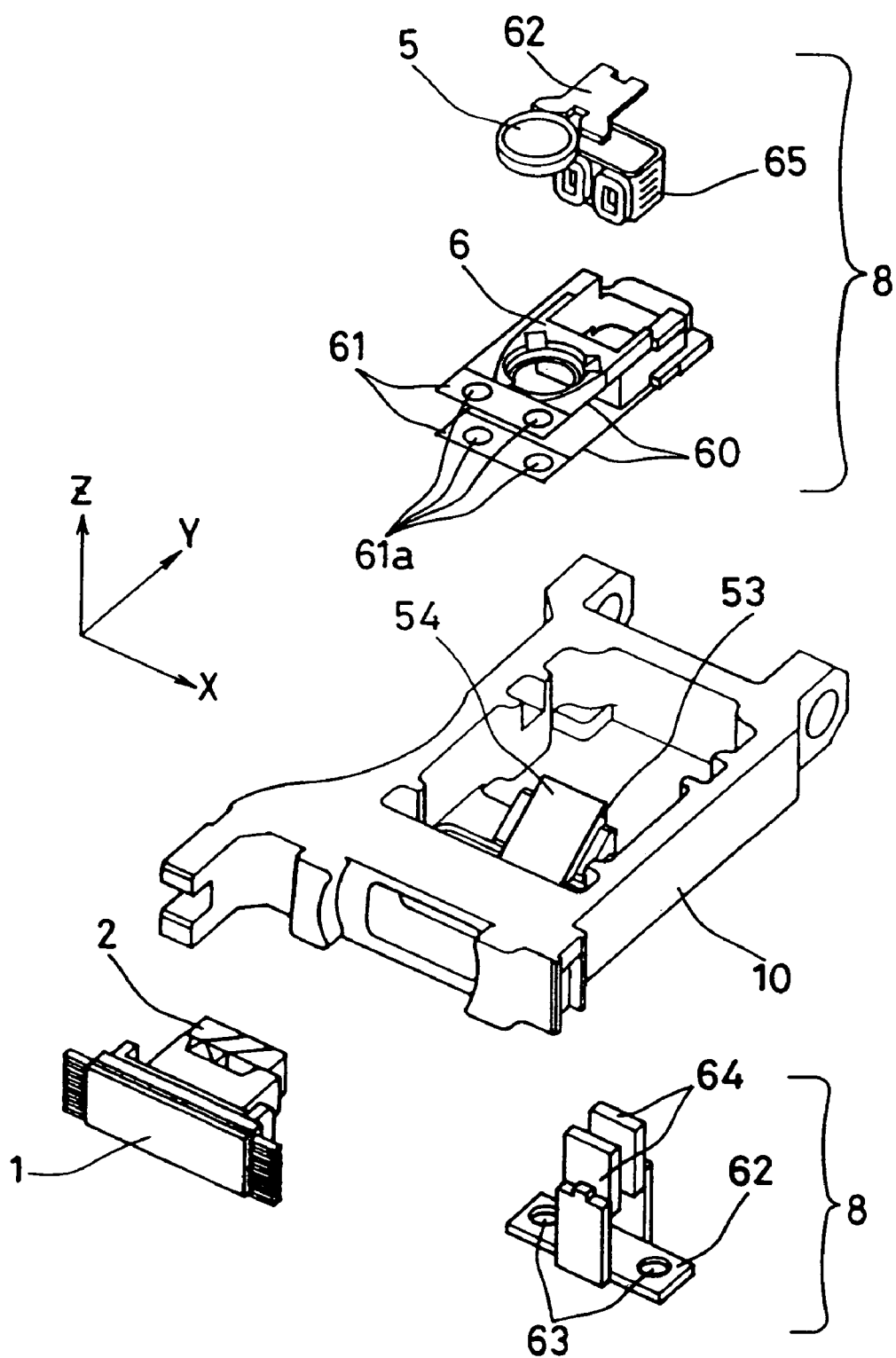
FIG. 22 is an exploded perspective view showing a schematic configuration of an optical head having another configuration according to the seventh embodiment of the present invention.
Figure 23:
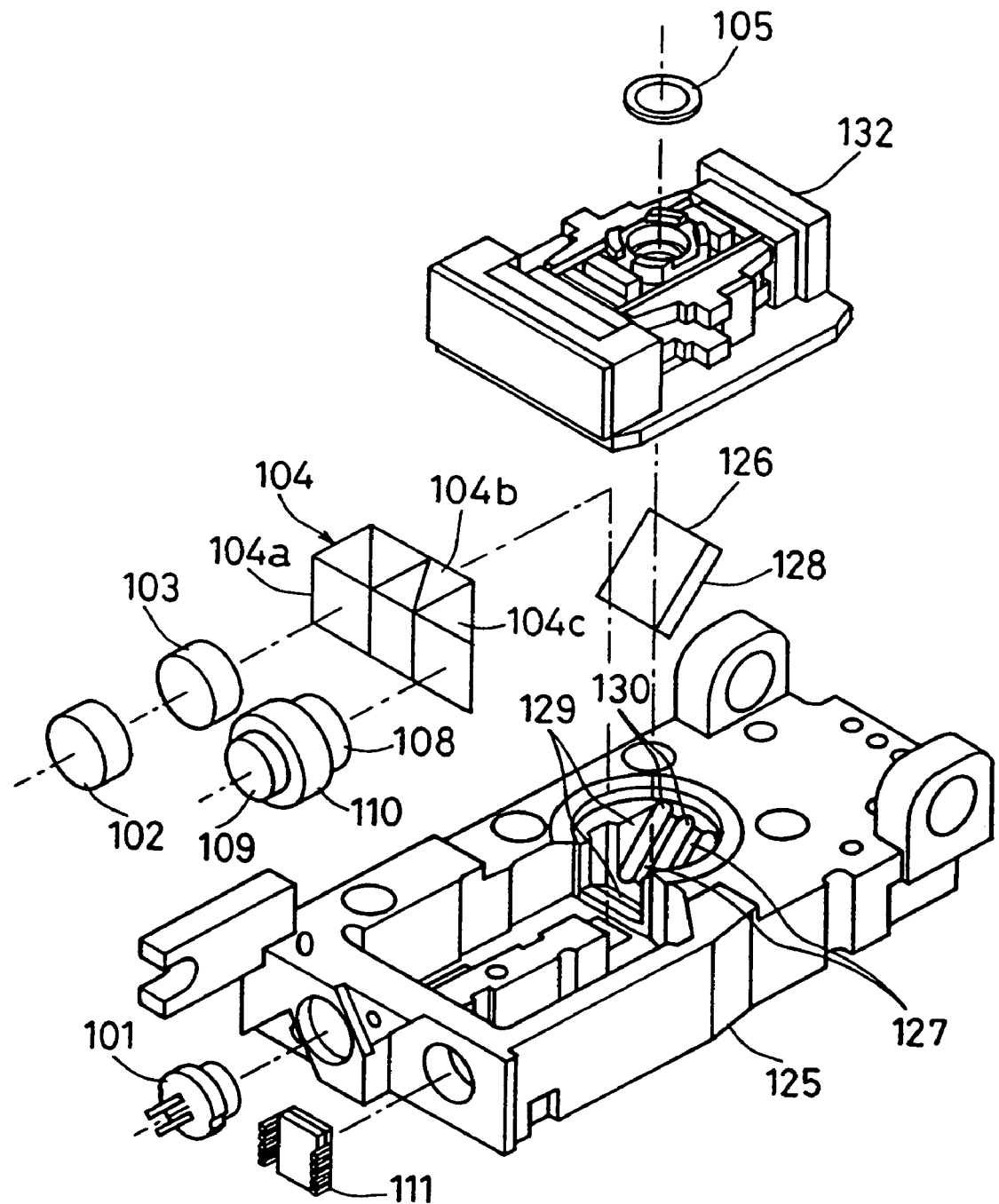
FIG. 23 is an exploded perspective view showing a schematic configuration of a conventional optical head.

In the seventh embodiment, the reflecting mirror 3 was used as a member for reflecting beams of light. Instead of the reflecting mirror 3, however, as in the fifth embodiment, a reflecting plane base 53 may be formed in integrally molding the optical bench 10 and the like and then a reflecting plane 54 may be formed on the surface of the reflecting plane base 53 by aluminum evaporation or the like as shown in FIG. 22. According to such a configuration, the number of components and the number of assembly steps are reduced, thus achieving cost reduction and higher precision of the reflecting plane. In FIG. 22, the configuration of the optical head thus obtained is shown with its components being disassembled so as to be understood easily.

Figure 24:
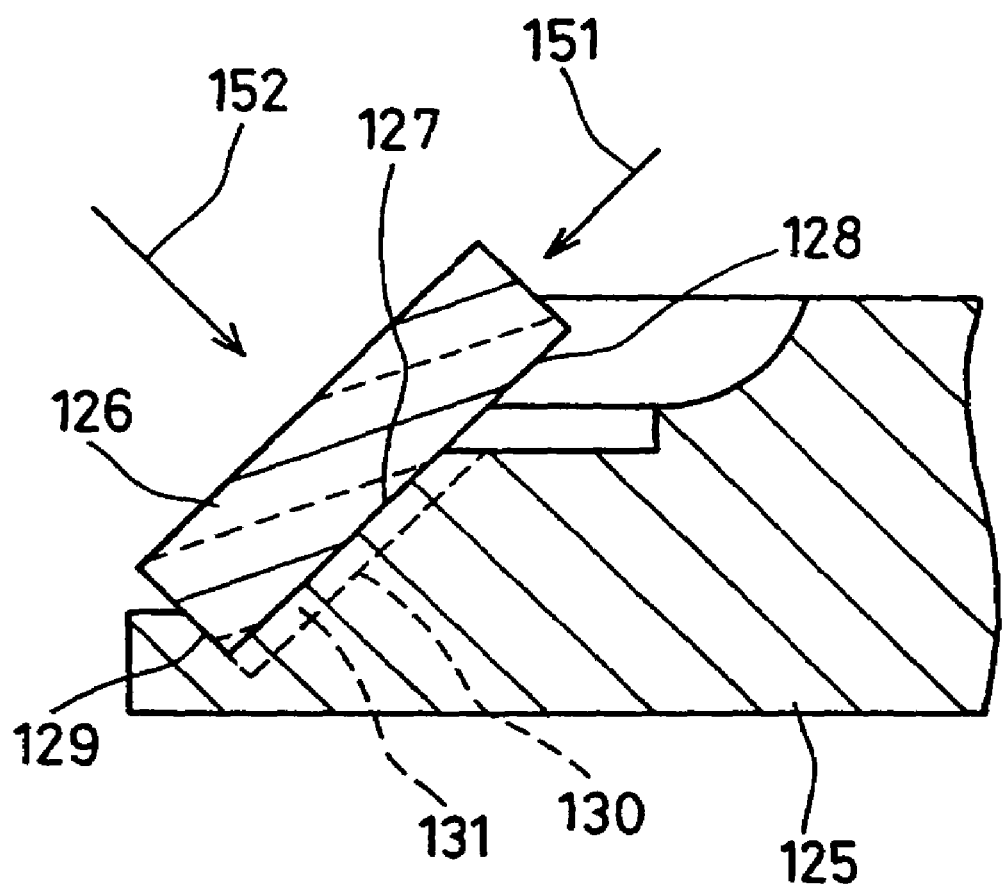
FIG. 24 is an enlarged sectional view showing a method of fixing a reflecting mirror in the optical head shown in FIG. 23.
Figure 25:
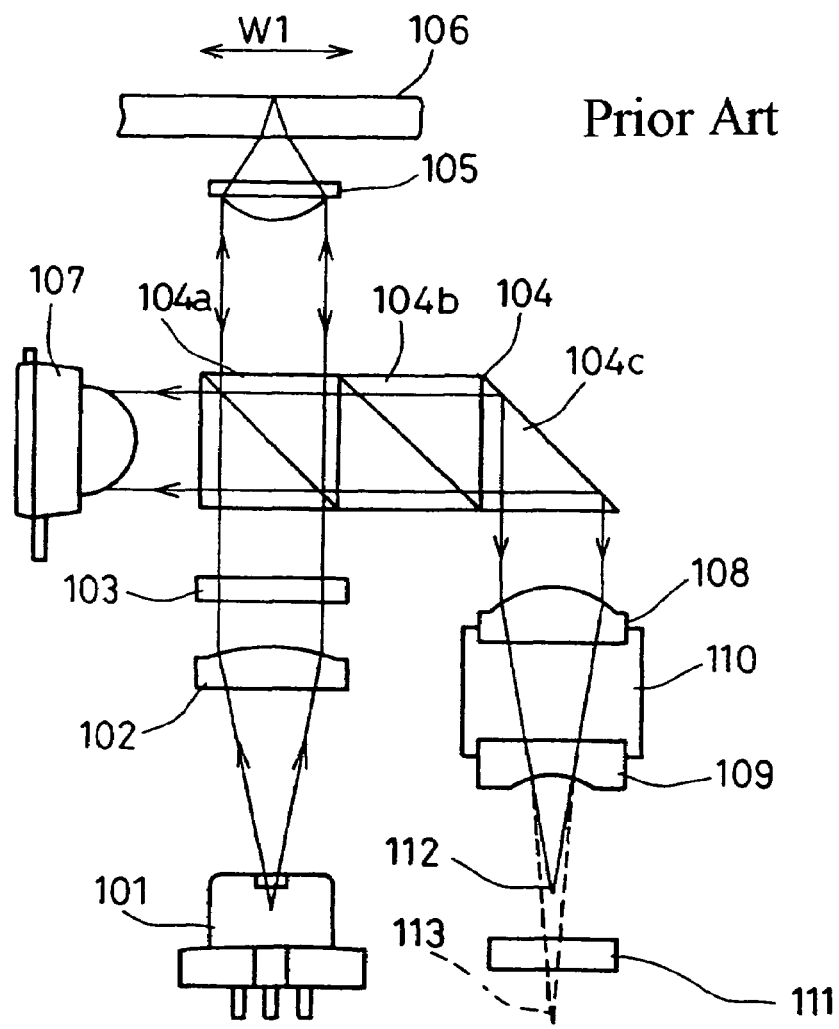
FIG. 25 includes FIG. 25A showing an optical-path diagram illustrating optical paths in the optical head shown in FIG. 23 and FIG. 25B showing a plan view illustrating light receiving areas and light spots on a light receiving plane of a multisplit photodetector.
Figure 25:
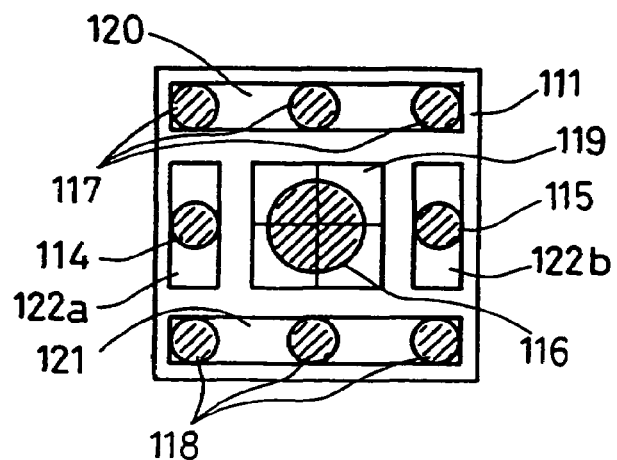
Figure 26:
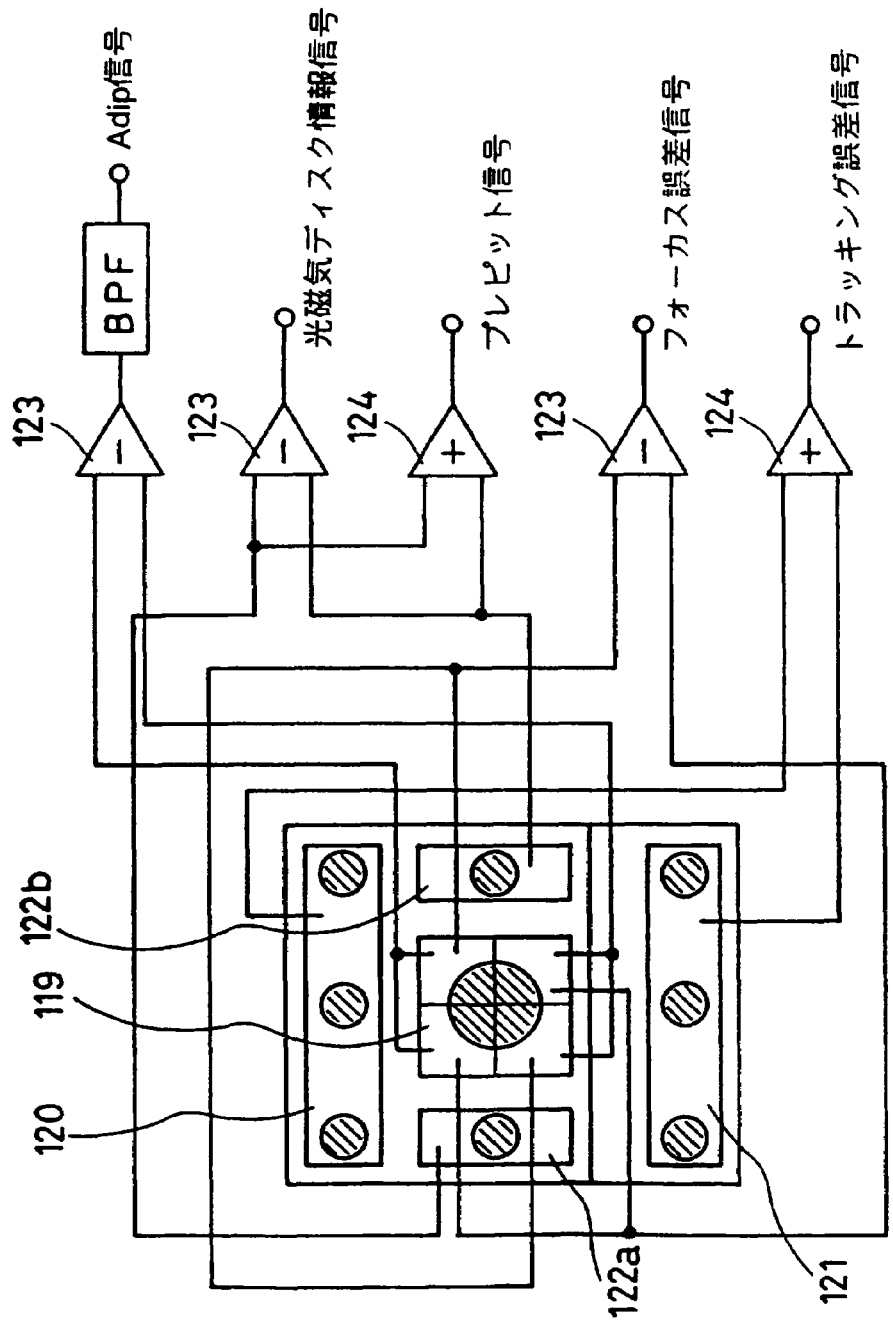
FIG. 26 is a signal circuit diagram showing a method of processing signals obtained by the multisplit photodetector in the optical head shown in FIG. 23.

In the seventh embodiment, the optical bench 10, the reflecting mirror 3, the objective lens holder 6, and the suspensions 60 were integrally molded. However, after the optical bench 10, the objective lens holder 6, and the suspensions 60 are integrally molded, the reflecting mirror may be bonded and fixed to a reflecting-mirror mounting portion formed in the optical bench 10. As a method of bonding and fixing the reflecting mirror, a method of forming the adhesion reference plane 128 and the positioning walls 129 in the optical bench 10 as shown in the conventional example also can be employed (see FIG. 24). However, it is more preferable that the reflecting mirror is fixed by the methods described in the first and second embodiments. Even in the method of the former, the number of components is reduced, thus achieving cost reduction. In the method of the latter, in addition to this, the effects described in the first and second embodiments can be obtained.

Furthermore, in the seventh embodiment, the optical bench 10, the reflecting mirror 3, the objective lens holder 6, and the suspensions 60 were integrally molded. However, in addition to those, further the yoke 62, the magnets 64, and the coil 65 also may be integrally molded. Further, the objective lens 5 also may be integrally molded.

In the seventh embodiment, a single resin material was used in integral molding. However, integral molding may be carried out using resin materials most suitable for respective components by, for example, using different materials for the optical bench 10 and the objective lens holder 6.

The embodiments described above are intended merely to indicate technical contents of the present invention and the present invention should not be understood as being limited to such embodiments. The present invention may be embodied by making various modifications within the scope described in the claims and the spirit of the present invention and should be interpreted broadly.

What is claimed is:

1. A method of manufacturing an optical head comprising a light source, an objective lens, a reflecting mirror that reflects beams of light from the light source to allow them to enter the objective lens, and an optical bench for maintaining the light source and the reflecting mirror, the method comprising:

placing the reflecting mirror and the optical bench on an external jig provided with a mirror holding portion for maintaining the reflecting mirror and opposing positioning walls provided on both sides in a horizontal direction of the mirror holding portion, bonding and fixing the reflecting mirror and the optical bench by filling an adhesive between side faces provided in the optical bench and side faces of the reflecting mirror opposing these side faces while the reflecting mirror and the optical bench are placed on the external jig, with the side faces of the reflecting mirror in contact with the positioning walls of the external jig and a reflecting plane of the reflecting mirror in contact with an angle reference plane of the mirror holding portion.

2. The method of manufacturing an optical head according to claim 1, wherein the reflecting mirror has a flat-plate shape.

3. The method of manufacturing an optical head according to claim 1, wherein the reflecting mirror and the optical bench are bonded and fixed using a UV adhesive.

4. The method of manufacturing an optical head according to claim 1, wherein the reflecting mirror is bonded and fixed by filling the adhesive in adhesive storages provided at vicinities of approximate centers of its two opposed side faces provided on the optical bench.

* * * * *